United States Patent
Kim et al.

(10) Patent No.: US 10,101,038 B2
(45) Date of Patent: Oct. 16, 2018

(54) GAS OVEN AND CONTROL METHOD THEREOF

(71) Applicant: Samsung Electronics Co., Ltd., Gyeonggi-do (KR)

(72) Inventors: Shin Kyum Kim, Seoul (KR); Hyun Sang Kim, Gyeonggi-do (KR); Dae Han Bang, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 253 days.

(21) Appl. No.: 14/988,607

(22) Filed: Jan. 5, 2016

(65) Prior Publication Data
US 2016/0195282 A1 Jul. 7, 2016

(30) Foreign Application Priority Data

Jan. 5, 2015 (KR) .................. 10-2015-0000924
Feb. 6, 2015 (KR) .................. 10-2015-0018613

(51) Int. Cl.
*F24C 15/32* (2006.01)
*F24C 3/12* (2006.01)
(Continued)

(52) U.S. Cl.
CPC .............. *F24C 15/322* (2013.01); *A21B 1/40* (2013.01); *F24C 3/004* (2013.01); *F24C 3/087* (2013.01); *F24C 3/128* (2013.01)

(58) Field of Classification Search
CPC ........ F24C 15/322; F24C 3/004; F24C 3/087; F24C 3/128; A21B 1/40
(Continued)

(56) References Cited

U.S. PATENT DOCUMENTS 2,713,861 A 7/1955 Biddle, Jr. et al.
3,132,231 A * 5/1964 Montgomery ............ F24C 7/00
126/19 M (Continued)

FOREIGN PATENT DOCUMENTS

| GB | 2321962 A | 8/1998 |
| JP | 57077828 A | * 5/1982 |
| JP | 59197738 A | * 11/1984 ............. F24C 3/008 |

OTHER PUBLICATIONS

"GE Advantium Oven Users Manual 2008.pdf", Manual MFL30039301 49-40481-2, Aug. 2008.*

(Continued)

*Primary Examiner* — Daniel E Namay

(57) ABSTRACT

A gas oven and a control method thereof are The control method of the gas oven, that includes a cooking space that is divided into a first cooking space and a second cooking space by a removable divider, a burner that directly heats a cooked object accommodated in the first cooking space, and an auxiliary heater that heats air of the first cooking space, includes performing baking for the first cooking space when a baking mode for the first cooking space is selected among a plurality of cooking modes, wherein the baking may include operating the burner according to the comparison result of a temperature of the first cooking space and a first setting temperature, and operating the auxiliary heater according to the comparison result of the temperature of the first cooking space and a second setting temperature.

20 Claims, 26 Drawing Sheets

(51) Int. Cl.
*F24C 3/08* (2006.01)
*A21B 1/40* (2006.01)
*F24C 3/00* (2006.01)

(58) Field of Classification Search
USPC .... 126/21 A, 15 A, 273 R; 99/331–333, 468
See application file for complete search history.

(56) References Cited

U.S. PATENT DOCUMENTS

| | | | | |
|---|---|---|---|---|
| RE26,944 E | * | 8/1970 | Getman | F24C 15/022 |
| | | | | 126/197 |
| 3,590,801 A | * | 7/1971 | Long | F24C 14/00 |
| | | | | 126/19 R |
| 4,598,691 A | | 7/1986 | Herrelko et al. | |
| 6,545,251 B2 | * | 4/2003 | Allera | F24C 7/06 |
| | | | | 126/339 |
| 7,038,175 B2 | * | 5/2006 | Henninger | F24C 14/00 |
| | | | | 126/273 R |
| 7,297,905 B2 | * | 11/2007 | Kim | F24C 15/325 |
| | | | | 219/400 |
| 7,343,850 B2 | * | 3/2008 | Gerl | F24C 15/2007 |
| | | | | 219/401 |
| 7,468,495 B2 | * | 12/2008 | Carbone | F24C 15/325 |
| | | | | 126/21 A |
| 7,967,002 B2 | * | 6/2011 | Inada | F24C 15/327 |
| | | | | 126/19 R |
| 8,049,142 B2 | * | 11/2011 | Blackson | F24C 7/087 |
| | | | | 219/398 |
| 8,405,003 B2 | * | 3/2013 | Shaffer | F24C 15/008 |
| | | | | 126/19 R |
| 8,895,907 B2 | * | 11/2014 | Lee | H05B 6/6473 |
| | | | | 126/21 A |
| 8,925,540 B2 | * | 1/2015 | Yu | F24C 15/00 |
| | | | | 126/19 R |
| 9,689,576 B2 | * | 6/2017 | Johnson | F24C 15/322 |
| 2004/0118392 A1 | * | 6/2004 | McFadden | A21B 1/245 |
| | | | | 126/21 A |
| 2005/0139202 A1 | * | 6/2005 | Herbert | F24C 15/322 |
| | | | | 126/21 A |
| 2008/0105133 A1 | * | 5/2008 | McFadden | A21B 1/245 |
| | | | | 99/324 |
| 2008/0105249 A1 | * | 5/2008 | McFadden | A21B 1/245 |
| | | | | 126/21 A |
| 2009/0034944 A1 | * | 2/2009 | Burtea | A21B 2/00 |
| | | | | 392/310 |
| 2010/0051244 A1 | * | 3/2010 | Armstrong | F24C 15/006 |
| | | | | 165/104.34 |
| 2011/0214661 A1 | * | 9/2011 | Hyun | F24C 15/006 |
| | | | | 126/21 A |
| 2012/0266859 A1 | * | 10/2012 | Park | F24C 3/128 |
| | | | | 126/273 R |
| 2014/0174426 A1 | * | 6/2014 | Moon | F24C 15/322 |
| | | | | 126/21 A |
| 2016/0102868 A1 | * | 4/2016 | Johnson | F24C 7/08 |
| | | | | 99/344 |
| 2016/0102869 A1 | * | 4/2016 | Johnson | F24C 15/322 |
| | | | | 99/337 |

OTHER PUBLICATIONS

Foreign Communication From a Related Counterpart Application, European Application No. 16150153.1-1605, Communication Pursuant to Article 94(3) EPC dated Dec. 12, 2016, 4 pages.

Extended European Search Report dated Apr. 7, 2016 in connection with European Application No. 16150153.1, 7 pages.

Communication from a foreign patent office in a counterpart foreign application, European Patent Office, "Communication under Rule 71(3) EPC," Application No. EP 16 150 153.1, dated Sep. 21, 2017, 75 pages.

* cited by examiner

GAS OVEN AND CONTROL METHOD THEREOF

CROSS-REFERENCE TO RELATED APPLICATION AND CLAIM OF PRIORITY

The present application is related to and claims benefit of Korean Patent Application No. 10-2015-0000924 filed on Jan. 5, 2015 and Korean Patent Application No. 10-2015-0018613 filed on Feb. 6, 2015, in the Korean Intellectual Property Office, the disclosure of which is incorporated herein by reference.

TECHNICAL FIELD

Embodiments of the disclosure relate to a gas oven and a control method thereof, and more particularly, to a gas oven which has a cooking space that can be partitioned by a divider and a control method thereof.

BACKGROUND

A gas oven is a home appliance that includes a cooking space for accommodating a cooked object, a burner for generating heat by burning gas and air, a gas supply flow passage for supplying gas to the burner, and an ignition device for generating a flame, and heats and cooks the cooked object accommodated in the cooking space at a high temperature. Air can be used to generate combustion, and combustion gas which is waste gas is generated after the generation of the combustion. Therefore the gas oven may further include an air supply flow passage for supplying air to the cooking space and an exhaust flow passage for exhausting the waste gas of the cooking space. Each of the air supply flow passage and the exhaust flow passage may communicate the inside and the outside of the cooking space. Warm air can rise and cold air can lower by the difference in density, and therefore the air supply flow passage may be provided to communicate with a lower portion of the cooking space, and the exhaust flow passage may be provided to communicate with an upper portion of the cooking space.

SUMMARY

To address the above-discussed deficiencies, it is a primary object to provide a gas oven which may include an air supply fan for supplying air to a burner provided at an upper side of a cooking space and adjust a rotational speed of the air supply fan so that the burner provided at an upper side of the cooking space may be smoothly operated, and a control method thereof.

It is another aspect of the disclosure to provide a gas oven which may perform a baking with a burner provided at an upper side of a cooking space and a control method thereof. Additional aspects of the disclosure will be set forth in part in the description which follows and, in part, will be obvious from the description, or may be learned by practice of the disclosure.

In accordance with one aspect of the disclosure, a control method of a gas oven which includes a cooking space that is divided into a first cooking space and a second cooking space by a removable divider, a burner that directly heats a cooked object accommodated in the first cooking space, and an auxiliary heater that heats air of the first cooking space, includes: performing baking for the first cooking space when a baking mode for the first cooking space is selected among a plurality of cooking modes, wherein the baking for the first cooking space includes operating the burner so that a temperature of the first cooking space reaches a first setting temperature, and operating the auxiliary heater so that the temperature of the first cooking space reaches a second setting temperature higher than the first setting temperature.

Here, the operating of the burner may include stopping the operating of the burner when the temperature of the first cooking space is the first setting temperature or higher during the operating of the burner, and intermittently operating the burner when the temperature of the first cooking space is lower than the first setting temperature while the operating of the burner is stopped.

Also, the operating of the auxiliary heater may include stopping the operating of the auxiliary heater when the temperature of the first cooking space is the second setting temperature or higher during the operating of the auxiliary heater, and operating the auxiliary heater when the temperature of the first cooking space is lower than the second setting temperature while the operating of the auxiliary heater is stopped. Also, the control method may further include stopping operating of a convection fan for circulating the air of the first cooking space during the operating of the burner; and operating the convection fan while the operating of the burner is stopped.

In accordance with another aspect of the disclosure, a gas oven includes: a cooking space; a divider that is removably provided in the cooking space and divides the cooking space into a first cooking space and a second cooking space; a first burner that directly heats a cooked object accommodated in the first cooking space by burning a gaseous fuel; a second burner that heats air of the second cooking space by burning the gaseous fuel; an input unit that receives a bake-heating command from a user; and a control unit that operate the first burner in response to the bake-heating command for the first cooking space, stops operation of the first burner when a temperature of the first cooking space is a first reference temperature or higher and repeats the operation of the first burner and the stopping of the operation of the first burner when the temperature of the first cooking space is lower than the first reference temperature.

Here, in response to the bake-heating command for the second cooking space, the control unit may stop operation of the second burner when a temperature of the second cooking space is the first reference temperature or higher, and operate the second burner when the temperature of the second cooking space is lower than the first reference temperature. Also, the gas oven may further include an auxiliary heater that heats air of the first cooking space, wherein the control unit may supply power to the auxiliary heater when the temperature of the first cooking space is lower than a second reference temperature, and stops the supply of the power to the auxiliary heater when the temperature of the first cooking space is the second reference temperature or higher. Also, the second reference temperature may be higher than the first reference temperature by 10 to 30 degrees Fahrenheit.

Also, the gas oven may further include a convection fan that circulates air of the first cooking space, wherein the control unit stops operation of the convection fan while the first burner is operated, and operates the convection fan while the operation of the first burner is stopped. Also, the gas oven may further include an auxiliary air supply fan that supplies air to the first cooking space, wherein the control unit operates the auxiliary air supply fan when the first burner is operated, and stops the operation of the auxiliary air supply fan when the operation of the first burner is stopped. Also, when the second burner is operated during the operation of the auxiliary air supply fan, the control unit may reduce a rotational speed of the auxiliary air supply fan. Also, when the temperature of the first cooking space is a predetermined fan protection temperature or higher, the control unit may operate the air supply fan.

In accordance with still another aspect of the disclosure, a control method of a gas oven which includes a cooking space that is divided into a first cooking space and a second cooking space by a removable divider, a first burner that directly heats a cooked object accommodated in the first cooking space, and a second burner that heats air of the second cooking space, includes: receiving a bake-heating command from a user; and performing a bake-heating operation of the first cooking space when the bake-heating command for the first cooking space is input, wherein the bake-heating operation of the first cooking space includes stopping operation of the first burner when a temperature of the first cooking space is a first reference temperature or higher, and repeating the operation of the first burner and the stopping of the operation of the first burner when the temperature of the first cooking space is lower than the first reference temperature.

Here, the control method may further include performing a bake-heating operation of the second cooking space when the bake-heating command for the second cooking space is input, wherein the bake-heating operation of the second cooking space includes stopping operation of the second burner when a temperature of the second cooking space is the first reference temperature or higher, and operating the second burner when the temperature of the second cooking space is lower than the first reference temperature.

Also, the control method may further include supplying power to an auxiliary heater for heating air of the first cooking space when the temperature of the first cooking space is lower than a second reference temperature; and stopping the supply of the power to the auxiliary heater when the temperature of the first cooking space is the second reference temperature or higher. Also, the second reference temperature may be higher than the first reference temperature by 10 to 30 degrees Fahrenheit. Also, the control method may further include stopping operation of a convection fan for circulating air of the first cooking space while the first burner is operated; and operating the convection fan while the operation of the first burner is stopped. Also, the control method may further include operating an auxiliary air supply fan for supplying air to the first cooking space when the first burner is operated; and stopping the operation of the auxiliary air supply fan when the operation of the first burner is stopped. Also, the control method may further include reducing a rotational speed of the auxiliary air supply fan when the second burner is operated during the operation of the auxiliary air supply fan.

Also, the control method may further include operating the air supply fan when the temperature of the first cooking space is a predetermined fan protection temperature or higher. According to an aspect of the disclosure, in a gas oven and a control method thereof, when the burner provided at an upper side of the cooking space is operated during the operation of the air supply fan, the rotational speed of the air supply fan may be reduced so that the burner provided at a lower side thereof may be smoothly operated. According to another aspect of the disclosure, in a gas oven and a control method thereof, baking may be performed only using the upper burner by intermittently operating the burner provided at the upper side of the cooking space.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

These and/or other aspects of the disclosure will become apparent and more readily appreciated from the following description of the embodiments, taken in conjunction with the accompanying drawings of which: For a more complete understanding of the present disclosure and its advantages, reference is now made to the following description taken in conjunction with the accompanying drawings, in which like reference numerals represent like parts.

DETAILED DESCRIPTION

Figure 1:
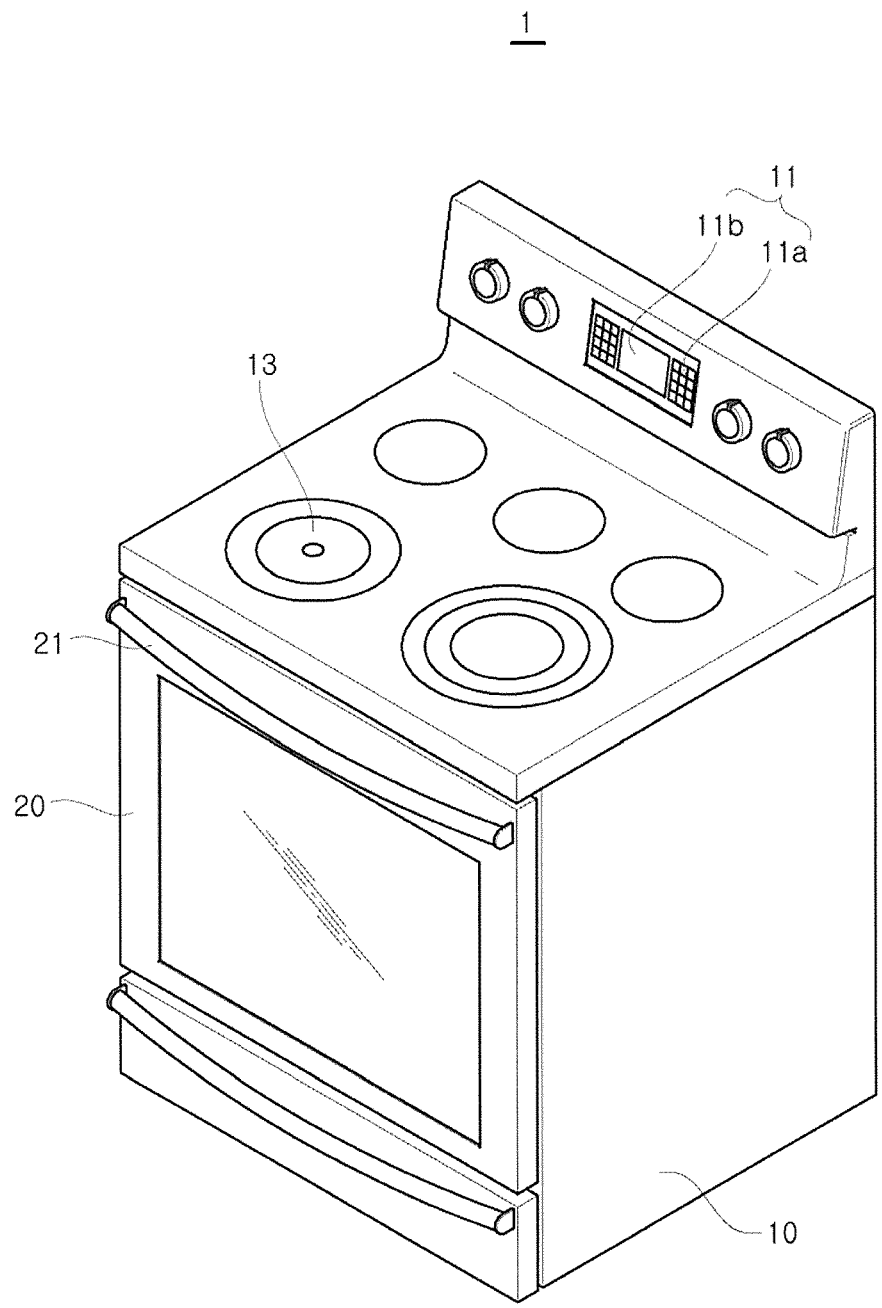
FIG. 1 illustrates the appearance of a gas oven in accordance with an embodiment of the disclosure.

FIGS. 1 through 25, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged heating device or heating system. Reference will now be made in detail to the embodiments of the disclosure, examples of which are illustrated in the accompanying drawings, wherein like reference numerals refer to like elements throughout. Hereinafter, an embodiment of the disclosure will be described in detail with reference to the accompanying drawings.

Figure 2:
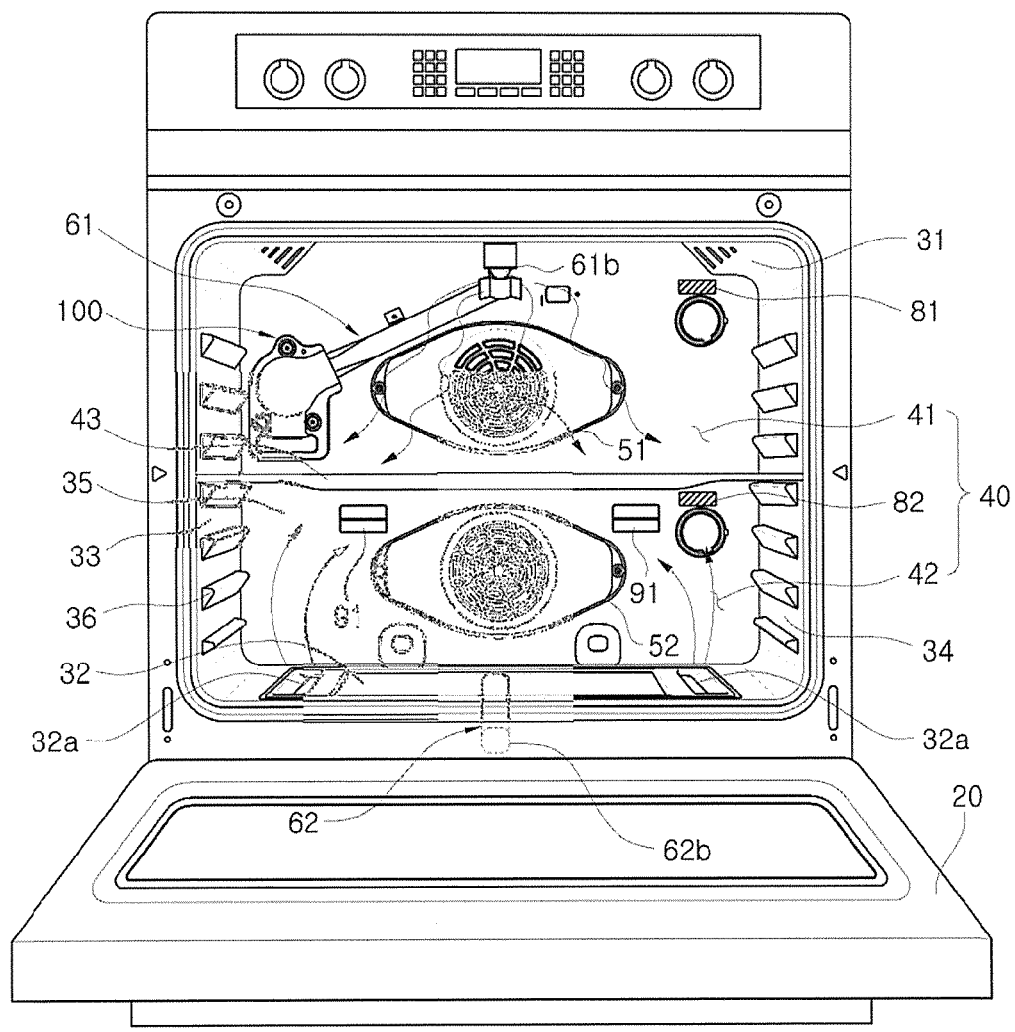
FIG. 2 illustrates the inside of a gas oven in accordance with an embodiment of the disclosure.
Figure 3:
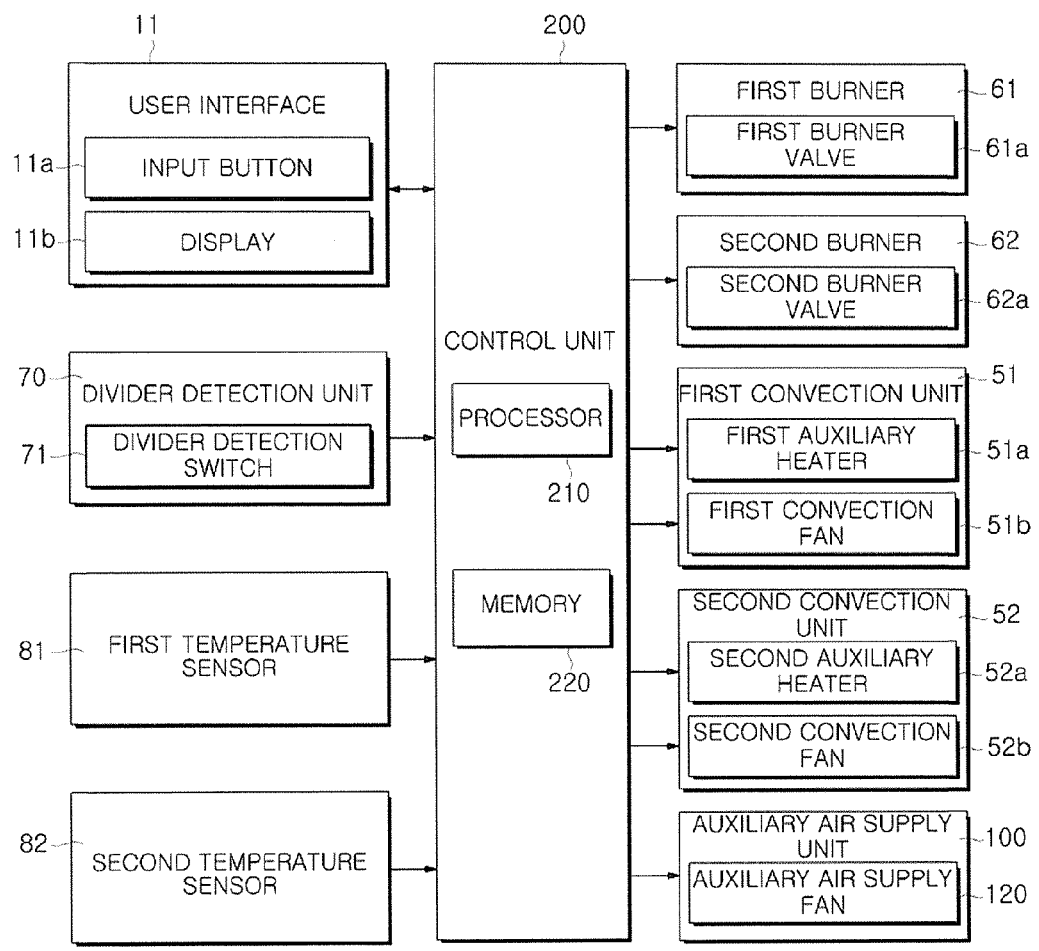
FIG. 3 illustrates various components included in a gas oven in accordance with an embodiment of the disclosure.
Figure 4:
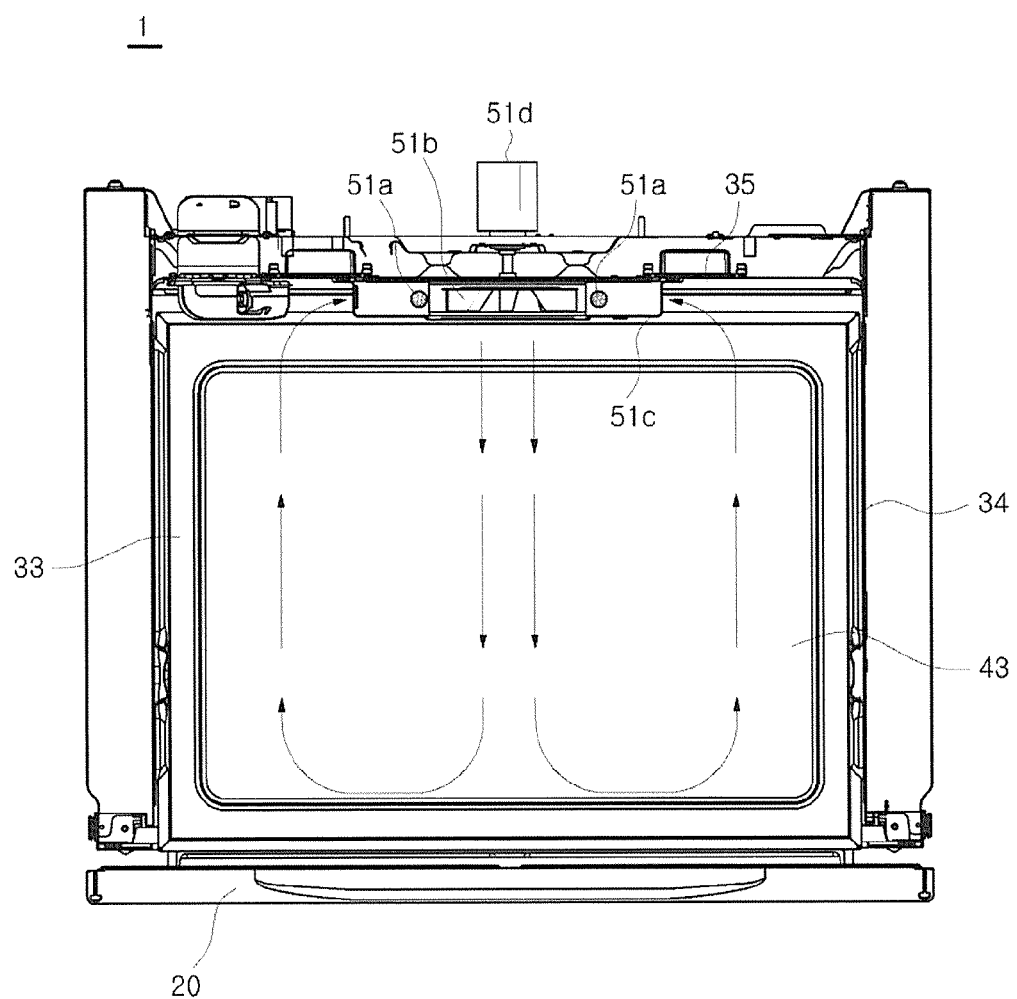
FIG. 4 illustrates heating by first and second convection units included in a gas oven in accordance with an embodiment of the disclosure.
Figure 5:
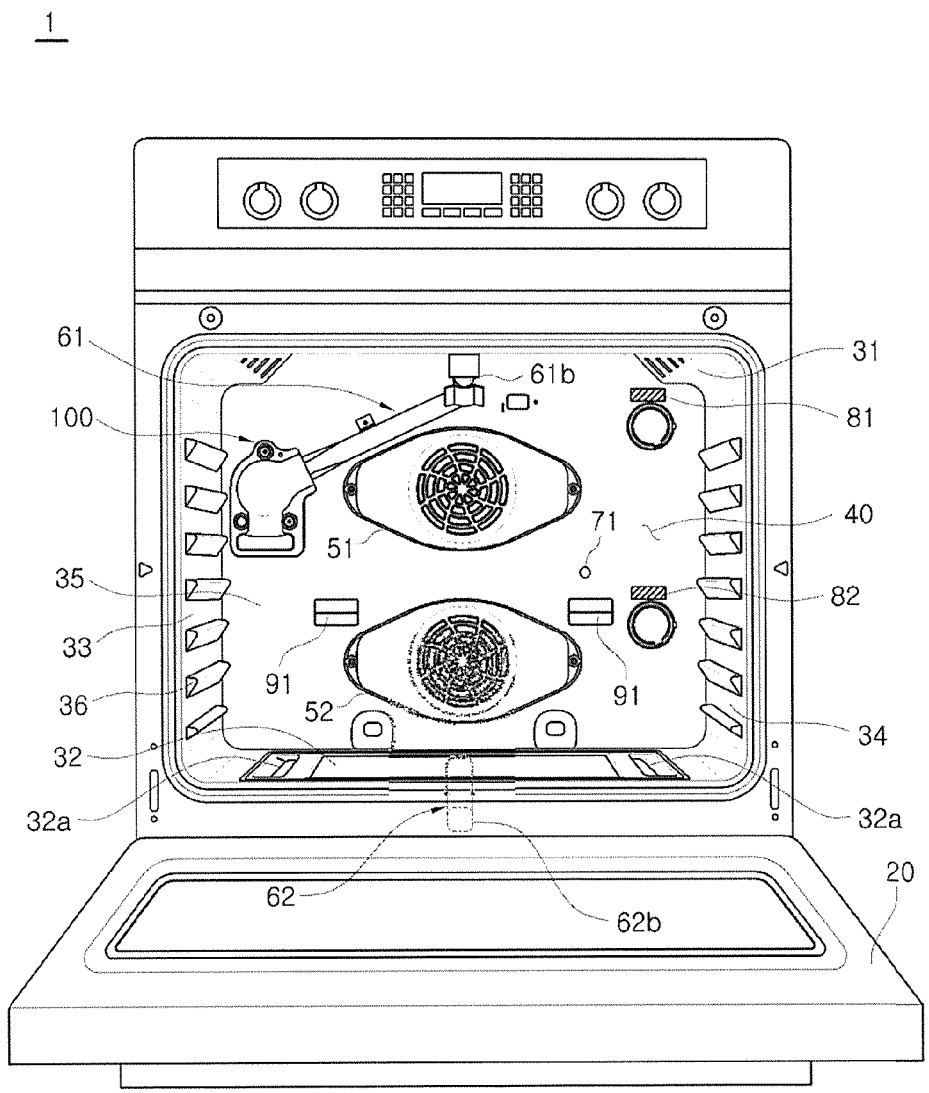
FIG. 5 illustrates the inside of a gas oven in which a divider is not mounted.

FIG. 1 illustrates the appearance of a gas oven in accordance with an embodiment of the disclosure. FIG. 2 illustrates the inside of a gas oven in accordance with an embodiment of the disclosure. FIG. 3 illustrates various components included in a gas oven in accordance with an embodiment of the disclosure. FIG. 4 illustrates heating by first and second convection units included in a gas oven in accordance with an embodiment of the disclosure. FIG. 5 illustrates the inside of a gas oven in which a divider is not mounted.

Referring to FIGS. 1 to 5, a gas oven 1 includes a main body 10 that accommodates various components therein and a cooktop 13 that is provided at an upper end of the main body 10 and heats a cooking container in which a cooked object is contained. In addition, a cooking space 40 for accommodating a cooked object is formed inside the main body 10. The cooking space 40 may be formed in a substantially box shape by a top wall 31, a bottom wall 32, a left side wall 33, a right side wall 34, and a rear wall 35, and a front surface of the cooking space 40 is provided to be opened in order to take out and put in of the cooked object. A door 20 which is rotatably coupled to the main body 10 in a vertical direction may be provided in the opened front surface of the cooking space 40, and the cooking space 40 may be opened and closed by the door 20. In addition, a handle 21 may be provided in the door 20 so that the door 20 may be easily opened and closed by a user.

In addition, a plurality of supports 36 in which racks (not illustrated) on which the cooked object can be put are mounted may be provided inside the cooking space 40, and are formed to protrude from the left side wall 33 and the right side wall 34. The cooking space 40 may be partitioned by a divider 43. The divider 43 may be detachably mounted inside the cooing space 40, and vertically or horizontally divide the cooking space 40. For example, as illustrated in FIG. 2, the divider 43 may be mounted in parallel to the top wall 31 and the bottom wall 32 of the cooking space 40 to divide the cooking space 40 into an upper first cooking space 41 and a lower second cooking space 42.

The divider 43 may be made of an insulating material, and the first cooking space 41 and the second cooking space 42 may be insulated by the divider 43. In addition, the sizes of the first cooking space 41 and the second cooking space 42 divided by the divider 43 are not necessarily equal to each other, and may be different from each other. In order to heat the cooked object accommodated in the cooking space 40, the gas oven 1 may have a variety of components. The gas oven 1 may include a plurality of burners for heating the cooking space 40 by burning a gaseous fuel, a plurality of convection units 51 and 52 for circulating air of the cooking space 40, an auxiliary air supply unit 100 for assisting supply of air to the cooking space 40, a user interface 11 interacting with a user, a divider detection unit 70 for detecting mounting of the divider 43 of the cooking space 40, a plurality of temperature sensors 81 and 82 for detecting a temperature of the cooking space 40, and a control unit 200 for controlling the overall operations of the gas oven 1.

The plurality of burners 61 and 62 may include the first burner 61 that is provided in an upper portion of the cooking space 40 and the second burner 62 that is provided in a lower portion of the cooking space 40. Specifically, when the cooking space 40 is divided into the upper first cooking space 41 and the lower second cooking space 42 by the divider 43, the first burner 61 may be positioned in the first cooking space 41 and the second burner 62 may be positioned in the second cooking space 42. The first burner 61 may include a first pipe burner 61b for generating a flame used for heating the cooked object accommodated in the cooking space 40 and a first burner valve 61a for regulating a gaseous fuel supplied to the first pipe burner 61b.

The first pipe burner 61b may extend from the rear surface of the cooking space 40 to the front side, and a plurality of gas outflow holes from which the gaseous fuel flows may be provided on a side surface of the first pipe burner 61b so as to generate a flame. The first burner valve 61a may be provided on a first gas supply pipe (not illustrated) for supplying a gaseous fuel to the first pipe burner 61b from an external gas supply source (not illustrated), and open and close the first gas supply pipe. The first burner valve 61a may adopt a bi-metal valve, a solenoid vale, or the like.

When the cooking space 40 is divided into the first cooking space 41 and the second cooking space 42 by the divider 43, the first burner 61 may heat a cooked object accommodated in the first cooking space 41. In addition, the first burner 61 may be provided in the upper portion of the cooking space 40 so as to be exposed. As a result, the first burner 61 may directly heat the cooked object accommodated in the cooking space 40 as illustrated in FIG. 2. Specifically, the cooked object may be directly heated by radiant heat generated by the flame of the first burner 61. The second burner 62 may include a second pipe burner 62b for generating a flame used for heating the cooking space 40 and a second burner valve 62*a* for regulating a gaseous fuel supplied to the second pipe burner 62*b*.

The second pipe burner 62*b* may extend from the rear surface of the cooking space 40 to the front side, and a plurality of gas outflow holes from which the gaseous fuel flows may be provided on a side surface of the second pipe burner 62*b* so as to generate a flame. The second burner valve 62*a* may be provided on a second gas supply pipe (not illustrated) for supplying a gaseous fuel from an external gas supply source (not illustrated) to the second pipe burner 62*b*, and open and close the second gas supply pipe. Such a second burner valve 62*a* may adopt a bi-metal valve, a solenoid valve, or the like.

When the cooking space 40 is divided into the first cooking space 41 and the second cooking space 42 by the divider 43, the second burner 62 may heat a cooked object accommodated in the second cooking space 42. In addition, the second burner 62 may be provided below the bottom wall 32 of the cooking space 40. Specifically, air heated by the second burner 62 is supplied into the cooking space 40 through a heating hole 32*a* of the bottom wall 32, and the cooked object is cooked by the heated air inside the cooking space 40.

The plurality of convection units 51 and 52 may be provided at a rear surface of the cooking space 40, and include the first convection unit 51 provided at an upper portion of the rear surface and the second convection unit 52 provided at a lower portion of the rear surface. Specifically, when the cooking space 40 is divided into the upper first cooking space 41 and the lower second cooking space 42 by the divider 43, the first convection unit 51 may be provided in the first cooking space 41, and the second convection unit 52 may be provided in the second cooking space 42.

The first convection unit 51 may include a first convection fan 51*b* for circulating air inside the cooking space 40, a first auxiliary heater 51*a* for auxiliarily heating the inside of the cooking space 40, and a first convection housing 51*c* for accommodating the first convection fan 51*b* and the first auxiliary heater 51*a*. The first convection fan 51*b* is rotated by receiving a rotational force from a first convection fan motor 51*d*, and circulates air inside the cooking space 40. Specifically, the first convection fan 51*b* provided at the rear surface of the cooking space 40 discharges air towards the front side of the cooking space 40. The air discharged towards the front side of the cooking space 40 by the first convection fan 51*b* is circulated inside the cooking space 40 as illustrated in FIG. 4, and then returns to the first convection fan 51*b* again.

Since the air inside the cooking space 40 is circulated by the first convection fan 51*b*, the inside of the cooking space 40 may have a uniform temperature distribution. The first auxiliary heater 51*a* heats the air discharged by the first convection fan 51*b*. Specifically, the air heated by the first auxiliary heater 51*a* is discharged to the inside of the cooking space 40 by the first convection fan 51*b*. The first auxiliary heater 51*a* emits less heat than that in the first burner 61 and the second burner 62. Accordingly, the first auxiliary heater 51*a* may be used for the purpose of assisting the first burner 61 and the second burner 62.

The second convection unit 52 may also include a second convection fan 52*b* for circulating air inside the cooking space 40, a second auxiliary heater 52*a* for auxiliarily heating the inside of the cooking space 40, and a second convection housing for accommodating the second convection fan 52*b* and the second auxiliary heater 52*a*. The second convection fan 52*b* is rotated by receiving a rotational force from a second convection fan motor and circulates air inside the cooking space 40, and the second auxiliary heater 52*a* heats air discharged by the second convection fan 52*b*. The second auxiliary heater 52*a* emits less heat than that in the first burner 61 and the second burner 62, and thereby is used for the purpose of assisting the first burner 61 and the second burner 62. An air supply port (not illustrated) for supplying air for combustion of the second burner 62 is provided in the bottom wall 32. The auxiliary air supply unit 100 may supply air for combustion of the first burner 61.

Air containing oxygen can be used to burn a fuel. If the air containing oxygen is not supplied, a flame burning the fuel is immediately extinguished.

As described herein, the first burner 61 and the second burner 62 may heat the cooking space 40 by burning the gaseous fuel. In addition, as is well-known, the burned gas moves from bottom to top, and therefore an air supply port for supplying air is generally provided in the lower portion of the cooking space 40. Accordingly, it is possible to receive fresh air from the air supply port (not illustrated) formed in the lower portion of the cooking space 40. That is, a separate air supply device for supplying air to the second burner 62 may not be required.

On the other hand, the first burner 61 is difficult to receive air from the air supply port (not illustrated) formed in the lower portion of the cooking space 40, and therefore a separate air supply device for supplying refreshed air to the first burner 61 can be used. Furthermore, when the cooking space 40 is divided into the first cooking space 41 and the second cooking space 42 by the divider 43, no air supply port is formed in the first cooking space 41, and therefore an air supply device for supplying refreshed air to the first burner 61 can be used.

In addition, when the divider 43 is not mounted, combustion waste gas generated by the second burner 62 provided in the lower portion of the cooking space 40 may interfere with the combustion of the first burner 61, and therefore an air supply device for supplying refreshed air to the first burner 61 can be used. Here, the waste gas refers to combustion gas generated after being burned, and when the gas is completely burned, carbon monoxide, water vapour, and the like may be generated, and the gas is incompletely burned, carbon monoxide, hydrogen, sulfur, and the like may be generated. By such waste gas of the second burner 62, incomplete combustion may occur in the first burner 61. In this manner, the auxiliary air supply unit 100 may be provided in the upper portion of the rear surface 35 of the cooking space 40 in order to supply refreshed air to the first burner 61.

The auxiliary air supply unit 100 will be described in detail. An exhaust port (not illustrated) for guiding the waste gas of the cooking space 40 to the outside of the gas oven 1 is provided in the top wall 31. In addition, when the divider 43 is mounted in the cooking space 40, the exhaust port (not illustrated) of the top wall 31 may discharge waste gas of the first cooking space 41. In addition, an auxiliary exhaust port 91 for guiding waste gas of the second cooking space 42 to the outside of the gas oven 1 is provided in the rear wall 35. When the divider 43 is mounted in the cooking space 40, waste gas generated by the combustion of the second burner 62 is difficult to be discharged to the exhaust port (not illustrated) of the top wall 31. For this reason, the auxiliary exhaust port 91 for discharging the waste gas of the second cooking space 42 is provided in a position corresponding to the second cooking space 42.

The user interface 11 may be provided in an upper end portion of the main body 10, and include a plurality of input buttons 11a for receiving a control command from a user and a display 11b for displaying operation information of the gas oven 1. The input buttons 11a may receive a set value associated with the operation of the gas oven 1 or a variety of control commands from the user. For example, the user may set a cooking time through the input buttons 11a, change a cooking temperature, select a cooking space (for example, the first cooking space or the second cooking space), or select a cooking method (for example, baking, broiling, or the like). In other words, the input buttons 11a may include a broiling button (not illustrated) for inputting a broiling command of the first cooking space 41, a baking button (not illustrated) for inputting a baking command of the first cooking space 41, a bake-heating button (not illustrated) for inputting a bake-heating command of the second cooking space 42, and the like.

The input buttons 11a may transmit an electrical signal corresponding to the set value or control command input by the user to the control unit 200. Such input buttons 11a may adopt a push switch, a toggle switch, a sliding switch, a membrane switch, a touch switch, a dial, or the like. The display 11b may display a variety of operation information associated with the operation of the gas oven 1 to the user in response to a control signal of the control unit 200. For example, the display 11b may display the cooking temperature or the cooking method which is selected by the user, or display a current temperature of the cooking space 40. Such a display 11b may adopt an LED (light emitting diode) panel, an OLED (Organic light emitting diode) panel, a liquid crystal display panel, or the like.

In addition, the display 11b may adopt a touch screen including a touch pad for detecting a user's touch. The touch screen may display the set value or the control command which is selected by the user, and receive the set value and the control command according to a user's touch input. The divider detection unit 70 may include a divider detection switch 71 for detecting whether the divider 43 is mounted in the cooking space 40.

As illustrated in FIG. 5, the divider detection switch 71 may be installed at the rear surface of the cooking space 40. Specifically, the divider detection switch 71 may be installed so as to protrude from a position corresponding to a position in which the divider 43 is mounted. The divider detection switch 71 may output "a divider detection signal" to the control unit 200 depending on whether the divider 43 is mounted. Specifically, when the divider 40 is mounted in the cooking space 40, the divider detection switch 71 is pressed by the divider 43 to output "a divider mounting signal", and when the divider 43 is removed from the cooking space 40, the divider detection switch 71 may be restored to its original position to output "a divider removal signal". Such a divider detection switch 71 may adopt a push switch, a toggle switch, a sliding switch, a membrane switch, or the like.

However, the divider detection unit 70 is not limited to include the divider detection switch 71, and the divider detection unit 70 may include a variety of components for detecting whether the divider 43 is mounted. For example, the divider detection unit 70 may include an infrared sensor, a capacitive proximity sensor, a hall sensor, or the like for detecting the divider 43 mounted in the cooking space 40. The plurality of temperature sensors 81 and 82 may include the first temperature sensor 81 provided in the upper portion of the cooking space 40 and the second temperature sensor 82 provided in the lower portion of the cooking space 40. Specifically, when the cooking space 40 is divided into the upper first cooking space 41 and the lower second cooking space 42 by the divider 43, the first temperature sensor 81 may detect a temperature of the first cooking space 41 and the second temperature sensor 82 may detect a temperature of the second cooking space 42.

Such the first and second temperature sensors 81 and 82 may include a thermistor whose electrical resistance is changed according to the temperature. The first and second temperature sensors 81 and 82 including the thermistor may output an electrical signal corresponding to the temperature of the cooking space 40. For example, when the divider 43 is mounted, the first temperature sensor 81 may output a first temperature detection signal corresponding to the temperature of the first cooking space 41 to the control unit 200, and the second temperature sensor 82 may output a second temperature detection signal corresponding to the temperature of the second cooking space 42 to the control unit 200. In addition, when the divider 43 is removed, the first and second temperature sensors 81 and 82 may output first and second temperature detection signals corresponding to the temperature of the cooking space 40 to the control unit 200.

The control unit 200 may include a memory 220 for storing a program or data for controlling the gas oven 1 and a processor 210 for processing data according to the program stored in the memory 220. The memory 220 may store a control program and control data for controlling the gas oven 1, or store a control command input through the user interface, a divider detection signal input from the divider detection unit 70, the first and second temperature detection signals input from the first and second temperature detection units, a control signal output by the processor, and the like. In addition, the memory 220 may include a volatile memory (not illustrated) such as an S-RAM (static random access memory), a D-RAM (dynamic RAM), or the like, and a non-volatile memory (not illustrated) such as a flash memory, a ROM (read only memory), an EPROM (erasable programmable ROM), an EEPROM (electrically erasable programmable ROM), or the like.

The non-volatile memory may be operated as an auxiliary storage device of the volatile memory, and store the control program and control data for controlling the operation of the gas oven 1. In addition, even when the power of the gas oven 1 is cut off, the non-volatile memory may maintain the stored data, and the volatile memory may temporarily store the stored data by loading the control program and control data from the non-volatile memory or temporarily store the control command input through the user interface, the divider detection signal input from the divider detection unit 70, the first and second temperature detection signals input from the first and second temperature detection units, the control signal output by the processor, operation information of the first burner 61 and the second burner 62, and the like. Unlike the non-volatile memory, the volatile memory may lose the stored data when the power of the gas oven 1 is cut off.

The processor 210 may process the control command, the divider detection signal, the first and second detection signals, and the like according to the control program stored in the memory 220, and output control signals for controlling the first burner 61, the second burner 62, the first convection unit 51, the second convection unit 52, and the auxiliary air supply unit 100. For example, when the broiling command for the first cooking space 41 is input from the user, the processor 210 may process the control command of the user, and output control signals for controlling the first burner 61, the first convection unit 51, and the auxiliary air supply unit 100 according to the first temperature detection signal. Specifically, when the temperature of the first cooking space 41 is lower than the cooking temperature, the processor 210 may output control signals for operating the first burner 61, the first convection unit 51, and the auxiliary air supply unit 100, and when the temperature of the first cooking space 41 is the cooking temperature or higher, the processor 210 may output control signals for stopping the operation of the first burner 61, the first convection unit 51, and the auxiliary supply unit 100.

A case in which the processor 210 and the memory 220 are separated from each other is described, but the disclosure is not limited thereto. For example, the processor 210 and the memory 220 may be configured in the form of a single chip. In this manner, the control unit 200 may control operations of various components included in the gas oven 1. In addition, the operation of the gas oven 1 which is described may be interpreted to be performed by a control operation of the control unit 200. Hereinafter, the configuration and operation of the auxiliary air supply unit 100 will be described.

Figure 6:
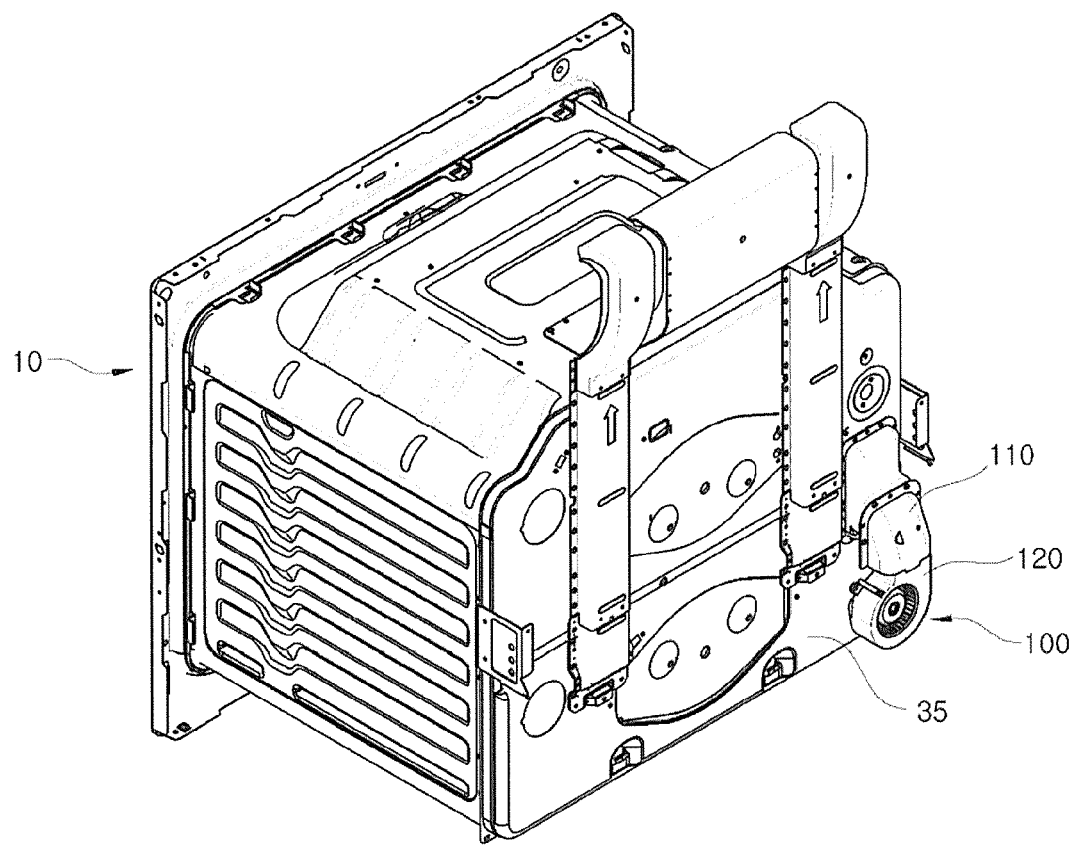
FIG. 6 illustrates a rear surface of a cooking space included in a gas oven in accordance with an embodiment of the disclosure.
Figure 7:
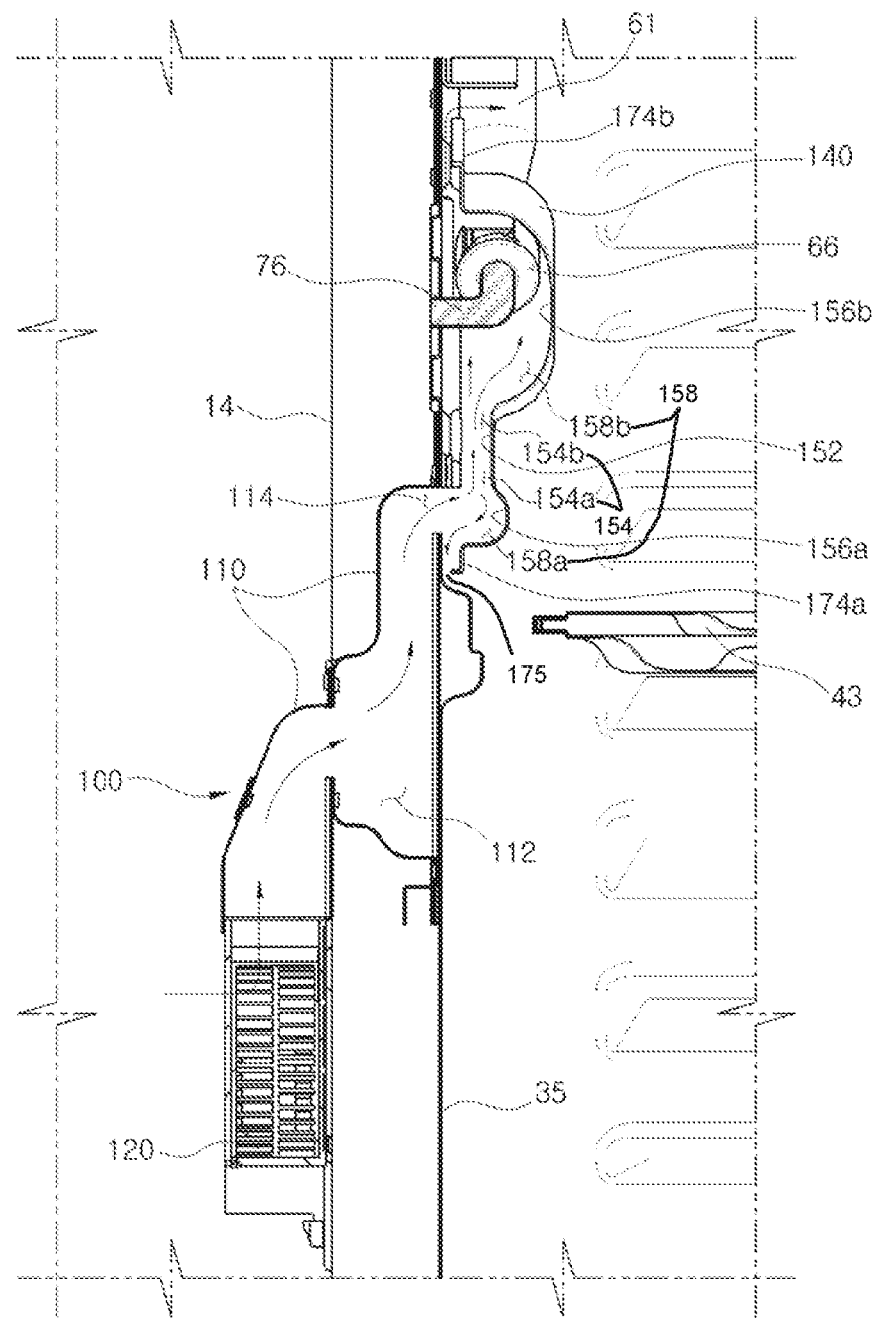
FIG. 7 illustrates a cross-section of an auxiliary air supply unit included in a gas oven in accordance with an embodiment of the disclosure and the flow of air in the auxiliary air supply unit.
Figure 8:
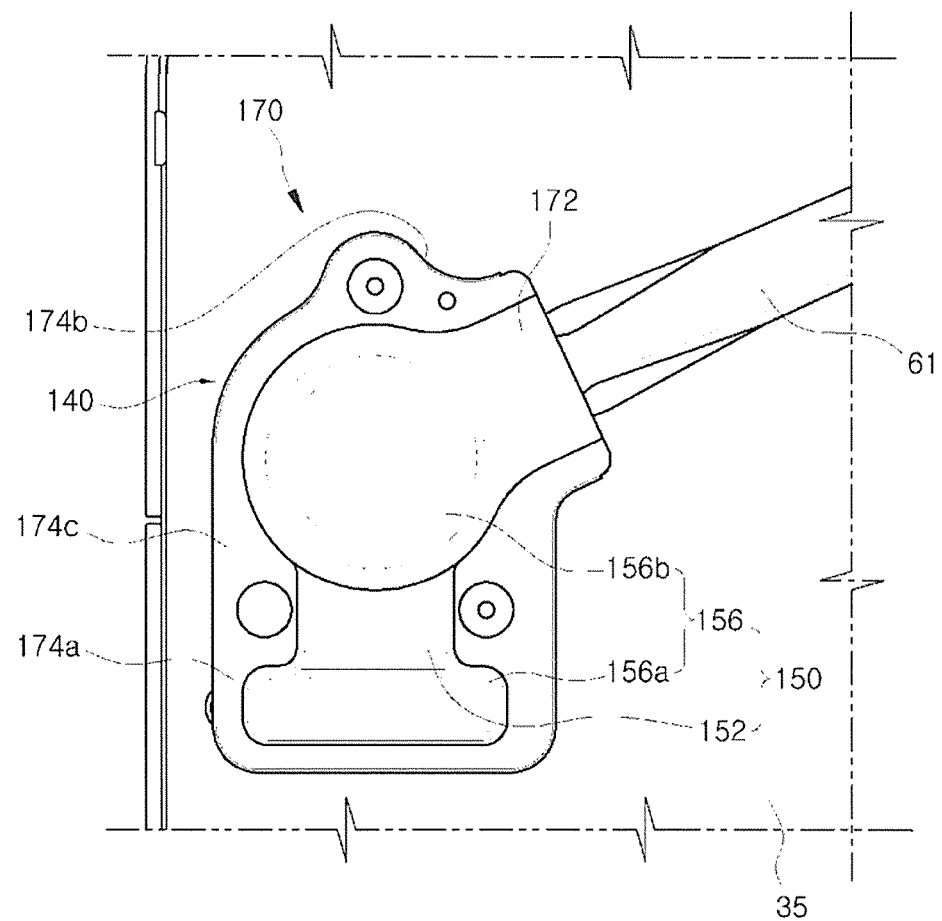
FIGS. 8 and 9 illustrate a dispersion unit included in a gas oven in accordance with an embodiment of the disclosure.
Figure 9:
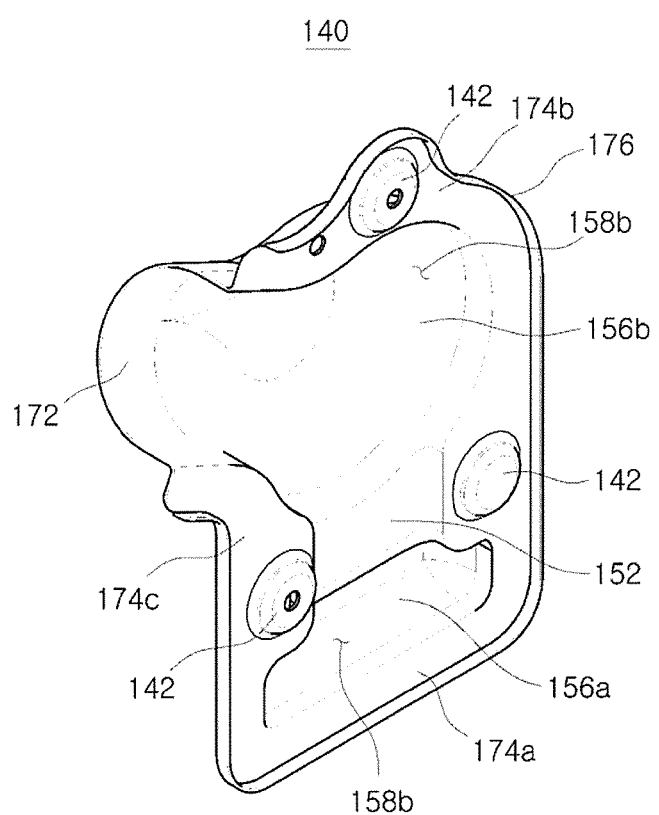
Figure 10:
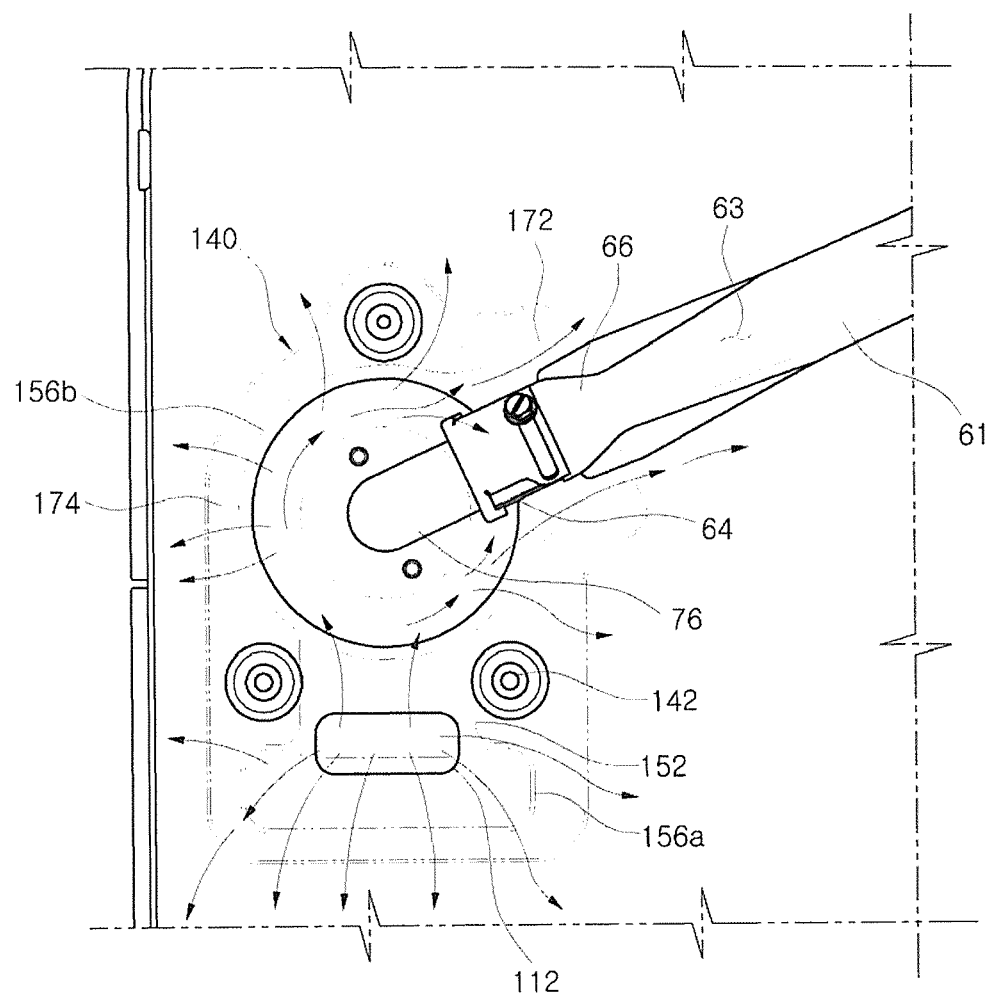
FIG. 10 illustrates the flow of air in a dispersion unit included in a gas oven in accordance with an embodiment of the disclosure.

FIG. 6 illustrates a rear surface of a cooking space included in a gas oven in accordance with an embodiment of the disclosure. FIG. 7 illustrates a cross-section of an auxiliary air supply unit included in a gas oven in accordance with an embodiment of the disclosure and the flow of air in the auxiliary air supply unit. FIGS. 8 and 9 illustrate a dispersion unit included in a gas oven in accordance with an embodiment of the disclosure. FIG. 10 illustrates the flow of air in a dispersion unit included in a gas oven in accordance with an embodiment of the disclosure.

Referring to FIGS. 6 to 10, the auxiliary air supply unit 100 includes an auxiliary air supply fan 120 for enabling outside air to forcibly flow to the inside of the cooking space, an auxiliary air supply duct 110 for guiding the air forcibly flowing by the auxiliary air supply fan 120 to the inside of the cooking space, and a dispersion unit 140 for dispersing the air guided to the inside of the cooking space by the auxiliary air supply duct 110, throughout the inside of the cooking space. In addition, as illustrated in FIG. 6, the auxiliary air supply fan 120 and the auxiliary air supply duct 110 may be installed at an outer side 14 of the rear wall 35 of the cooking space, and the dispersion unit 140 may be installed at an inner side of the rear wall 35 of the cooking space.

An auxiliary air supply flow passage 112 is formed so as to pass through the rear surface 35 of the cooking space by the auxiliary air supply duct 110. Air may flow from the outside of the cooking space 40 to the inside of the cooking space 40 along the auxiliary air supply flow passage 112. In addition, gas may be guided to the inside of a head unit 66 through a gas supply flow passage 64, and injected to an inner space 63 of the first burner 61 through a nozzle 76 provided at an end portion of the gas supply flow passage.

When the gas is injected to the inner space 63 of the first burner 61 through the nozzle 76, a part of the air of the auxiliary air supply flow passage 112 may be sucked to the inner space of the first burner 61 together with the gas. The gas and air introduced to the inner space 63 of the first burner 61 may be mixed in the inner space 63 of the first burner 61 and discharged through an outflow hole of the first burner 61. The mixed gas may be burned by a flame which is ignited in an ignition device (not illustrated). In this instance, the air introduced into the first burner 61 together with the gas in this manner may be referred to as primary air.

In addition, air supplied to the cooking space 40 through a supply guide member 170 of the dispersion unit 140 may flow in the vicinity of the outflow hole of the first burner 61, be mixed with the gas discharged from the outflow hole, and be burned. In this instance, the air which flows to a periphery of the outflow hole of the first burner 61 through the supply guide member without flowing to the inside of the first burner 61 may be referred to as secondary air. Thus, the first burner 61 may generate a flame by receiving the primary air and the secondary air from the auxiliary air supply unit 100.

Meanwhile, the auxiliary air supply fan 120 may forcibly suck air outside the cooking space 40 and enable the sucked air to flow to the inside of the first burner 61 or the periphery of the first burner 61. The reason why the auxiliary air supply fan 120 enables the air to forcibly flow in this manner is to simultaneously operate the first burner 61 and the second burner 62. As described herein, when the first burner 61 and the second burner 62 are simultaneously operated, waste gas generated from the second burner 62 rises and flows to the periphery of the first burner 61, and incomplete combustion occurs in the first burner 61 by the waste gas introduced to the periphery of the first burner 61. In other words, the supply of the secondary air to the first burner 61 is not smoothly carried out by the waste gas of the second burner 62.

Even in a case in which the divider 43 is mounted in the cooking space 40 as well as in a case in which the divider 43 is removed from the cooking space 40, forcible air supply by the auxiliary air supply fan 120 can be used. The auxiliary air supply fan 120 may receive a rotational force from an auxiliary air supply fan motor (not illustrated), and the auxiliary air supply fan motor may be rotated at various rotational speeds. For example, when the auxiliary air supply fan motor adopts a DC motor, the auxiliary air supply fan motor may be rotated at various rotational speeds according to a magnitude of the supplied voltage. When a high voltage (such as 12 volts) is supplied to the auxiliary air supply fan motor, the auxiliary air supply fan motor may be rotated at a high speed, and when a low voltage (such as 8 volts) is supplied to the auxiliary air supply fan motor, the auxiliary air supply fan motor may be rotated at a low speed.

The dispersion unit 140 is provided in a discharge portion 114 of the auxiliary air supply flow passage 112, and disperses air supplied through the auxiliary air supply flow passage 112. Specifically, the dispersion unit 140 is arranged in an air discharge direction of the discharge portion 114 of the auxiliary air supply flow passage 112, and distributes outside air supplied through the auxiliary air supply flow passage 112 into primary air and secondary air. In addition, the secondary air may be efficiently supplied to the cooking space 40 by the dispersion unit 140. In addition, the dispersion unit 140 may be provided so as to prevent the discharge portion 114 of the auxiliary air supply flow passage 112 from being exposed to the cooking space 40. In other words, the dispersion unit 140 may be arranged in the air discharge direction of the discharge portion 114 so as to prevent the discharge portion 114 from being directly exposed to the cooking space 40.

Specifically, the dispersion unit 140 may be arranged in the air discharge direction of the discharge portion 114 so as to interrupt air discharged from the discharge portion 114. The dispersion unit 140 is arranged in the air discharge direction of the discharge portion 114, thereby preventing heated air generated in the cooking space 40 from flowing back to the discharge portion 114. In this manner, the discharge portion 114 is provided at the rear surface 35, and therefore the dispersion unit 140 may be arranged in front of the discharge portion 114.

Since the discharge portion 114 of the auxiliary air supply flow passage 112 which supplies the outside air to the cooking space 40 is arranged at the rear wall 35, the dispersion unit 140 is arranged at the rear wall 35. However, the disclosure is not limited thereto, and the dispersion unit 140 may be arranged at any one of the top wall 31, the left side wall 33, the right side wall 34, and the rear wall 35 which form the inner wall of the cooking space 40, according to the arrangement of the auxiliary air supply flow passage 112. The dispersion unit 140 may be coupled to the rear wall 35 by a unit coupling member 142. The unit coupling member 142 may be provided on an overflow member 174 which will be described later, and provided so as to protrude rather than the overflow member 174, so that the overflow member 174 may form an overflow gap 175 between the rear wall 35 and the overflow member 174.

The dispersion unit 140 may include a dispersion guide member 150 and a supply guide member 170. The air supplied through the auxiliary air supply flow passage 112 may pass through the dispersion guide member 150, and be discharged to the outside of the dispersion unit 140 through the supply guide member 170. That is, the air supplied through the auxiliary air supply flow passage 110 may be provided to supply the primary air to the first burner 61 or the secondary air to the cooking space 40 through the supply guide member 170. The supply guide member 170 includes a supply member 172 and an overflow member 174. The supply guide member 170 will be described.

The dispersion guide member 150 is provided to disperse or guide the air supplied through the auxiliary air supply flow passage 112. A dispersion flow passage 154 and a guide flow passage 158 which will be described later may be formed by an inner surface of the dispersion guide member 150. In order to reduce air resistance of air flowing in the flow passage, the inner surface of the dispersion guide member 150 may be formed in a curved surface. The dispersion guide member 150 may include a dispersion member 152 and a guide member 156.

The dispersion member 152 may disperse the air supplied through the auxiliary air supply flow passage 112. The dispersion member 152 may be formed to be close to the discharge portion 114 of the auxiliary air supply flow passage 112 rather than the inner surface of the adjacent dispersion unit 140. Specifically, since the discharge portion 114 of the auxiliary air supply flow passage 112 is provided at the rear wall 35 of the cooking space 40, the dispersion member 152 may be formed to be close to the discharge portion 114 of the auxiliary air supply flow passage 112 formed at the rear wall 35 rather than the inner surface of the adjacent dispersion unit 140. The dispersion member 152 may be formed to protrude from the inner surface of the dispersion unit 140 to the rear wall 35 rather than to the inner surface of the guide member 156.

The dispersion member 152 may form the dispersion flow passage 154 for dispersing air supplied through the discharge portion 114 of the auxiliary air supply flow passage 112. The dispersion flow passage 154 may include a first dispersion flow passage 154a facing in a lower side direction and a second dispersion flow passage 154b facing in an upper side direction. The first dispersion flow passage 154a may be provided in such a manner that air is discharged to a lower side of the cooking space 40, and the second dispersion flow passage 154b may be provided in such a manner that air is discharged to a middle side of the cooking space 40 and an upper side thereof.

The guide member 156 may be provided to be adjacent to the dispersion member 152 to guide the air dispersed from the dispersion member 152. The guide member 156 may be provided to communicate with the dispersion member 152. The guide flow passage 158 that is connected to the dispersion flow passage 154 is formed inside the guide member 156. The guide member 156 may include a first guide member 156a and a second guide member 156b.

The first guide member 156a may be arranged at one side of the dispersion member 152 so as to be close to the bottom surface of the cooking space 40 rather than the dispersion member 152. The first guide member 156a forms a first guide flow passage 158a in the longitudinal direction parallel to the bottom surface of the cooking space 40. The first guide flow passage 158a is provided to be connected to the above-described first dispersion flow passage 154a. In other words, air that flows in the first dispersion flow passage 154a out of the air dispersed by the dispersion member 152 may be guided to the first guide flow passage 158a.

The first guide flow passage 158a may be formed long in the longitudinal direction parallel to the bottom surface of the cooking space 40, so that the secondary air may be discharged with respect to the bottom surface of the cooking space 40. Specifically, the first guide flow passage 158a may be provided in such a manner that the air supplied through the first guide flow passage 158a by a first overflow member 174a which will be described later may be discharged to the bottom surface of the cooking space 40. Since the dispersion unit 140 is arranged in the first cooking space 41, air supplied by the first guide flow passage 158a and the first overflow member 174a may be supplied to a top surface of the divider 43 forming the bottom surface of the first cooking space 41. As will be described later, the first overflow member 174a may be formed along a periphery of the first guide member 156a, and therefore the air guided through the first guide flow passage 158a of the first guide member 156a may be discharged to both sides of the cooking space 40 as well as the bottom surface of the cooking space 40.

The first guide flow passage 158a may be formed long in the longitudinal direction parallel to the top surface of the divider 43 compared to the first dispersion flow passage 154a, and therefore the secondary air may be supplied over a wider area of the top surface of the divider 43 through the first guide flow passage 158a. The second guide member 156b is arranged at the other side of the dispersion member 152. The second guide member 156b forms a second guide flow passage 158b. The second guide flow passage 158b is provided to be connected to the above-described second dispersion flow passage 154b. In other words, the second guide flow passage 158b is provided in such a manner that air flowing in the second dispersion flow passage 154b out of the air dispersed by the dispersion member 152 may be guided to the second guide flow passage 158b.

The second guide member 156b is arranged at the upper side from the dispersion member 152 so that a part of the air dispersed by the dispersion member 152 may be guided to a supply unit 172 and a second overflow member 174b which will be described later. The shape of the second guide member 156b is not limited, but in the embodiment of the disclosure, the second guide member 156b may be formed in the shape of a hemisphere. Specifically, the second guide member 156b may be provided in such a manner that air supplied through the second guide flow passage 158b by the second overflow member 174b which will be described later may be discharged to the upper side of the cooking space 40 and a side surface thereof. The dispersion unit 140 may be arranged in the first cooking space 41, and therefore the air supplied by the second guide flow passage 158b and the second overflow member 174b may be supplied to the top wall 31, the left side wall 33, and the right side wall 34 of the first cooking space 41. In addition, as will be described, the second overflow member 174b may be formed along a periphery of the second guide member 156b, and therefore the air guided through the second guide flow passage 158b of the second guide member 156b may be discharged to the lower side of the cooking space 40 as well as the upper side and both sides of the cooking space 40. The first guide member 156a may be configured to be parallel to a top surface of the divider 43, but the disclosure is not limited thereto.

In addition, for convenience of description, a case in which the guide member 156 includes the first and second guide members 156a and 156b has been described, but the disclosure is not limited thereto. Any guide member may be used as long as the guide member is provided to correspond to the shape of the cooking space 40 and air supplied by the dispersion member 152 is dispersed and supplied to the inside of the cooking space 40 by the plurality of guide members 156.

The supply guide member 170 includes the supply member 172 and the overflow member 174. The supply guide member 170 is provided in such a manner that air passed through the dispersion guide member 150 may be supplied to the cooking space 40 or the first burner 61. The supply guide member 170 may be formed along the overall periphery of the dispersion guide member 150 with respect to the inner wall. Since the dispersion unit 140 and the discharge portion 114 are arranged at the rear wall 35, the supply guide member 170 may be formed along the overall periphery of the dispersion guide member 150 with respect to the rear wall 35. The air guided by the dispersion guide member 150 may be discharged through the supply guide member 170 formed in the overall periphery of the dispersion guide member 150, thereby preventing air heated in the cooking space 40 from flowing back to the inside of the dispersion guide member 150 through the supply guide member 170. The supply guide member 170 can be formed only a partial section of the periphery of the dispersion guide member 150.

The supply member 172 is provided at one side of the dispersion guide member 150 so that air mixed with gas introduced into the first burner 61 may be discharged. The supply member 172 may be provided so as to communicate with the guide member 156. The supply member 172 may extend from the second guide member 156b so as to communicate with the second guide member 156b. The supply member 172 may be provided so as to be spaced apart from the periphery of the head unit 66 of the first burner 61 by a predetermined distance. By this configuration, air moving to the supply member 172 out of the air guided to the second guide member 156b may be supplied to the head unit 66 of the first burner 61 while acting as the primary air, or supplied to the inside of the cooking space 40 while acting as the secondary air without flowing into the head unit 66 of the first burner 61.

The overflow member 174 is provided so as to discharge air to the cooking space 40. Specifically, the overflow member 174 is provided in such a manner that the air guided by the guide member 156 may be supplied to the cooking space 40. The overflow member 174 may be formed along at least a part of the periphery of the dispersion guide member 150 so as to discharge air to the cooking space 40. The overflow member 174 may be formed in the shape of a plane facing the rear wall 35 along at least a part of the periphery of the dispersion guide member 150 while having a predetermined width. In order to evenly supply the secondary air in different directions when the secondary air is supplied from the dispersion unit 140 to the cooking space 40, the overflow member 174 may be formed to have a predetermined width. However, the disclosure is not limited thereto, and the width of the overflow member 174 may vary in some sections, as necessary.

The overflow member 174 may be formed to be spaced apart from the inner wall of the cooking space 40 by a predetermined distance. Specifically, since the dispersion unit 140 is arranged at the rear surface 35 of the cooking space 40, the overflow member 174 may be formed to be spaced apart from the rear wall 35 by a predetermined distance. The distance between the overflow member 174 and the rear wall 35 may be provided to be smaller than a distance between the guide member 156 and the rear wall 35. The overflow member 174 may include the overflow gap 175. The overflow gap 175 is provided between the overflow member 174 and the rear wall 35, so that the air guided by the guide member 156 may flow.

The overflow member 174 may further include an overflow rib 176. The overflow rib 176 is formed along an outer periphery of the overflow member 174, and formed to be bent towards the inner wall from the outer periphery. The overflow gap 175 may include a first distance for the overflow gap 175 formed between the overflow member 174 and the rear wall 35 and a second distance for the overflow gap 175 formed between the overflow rib 176 and the rear wall 35. An end portion of the overflow rib 176 may be provided to be close to the rear wall 35 rather than the overflow member 174, and therefore the second distance for the overflow gap 175 may be formed to be smaller than the first distance for the overflow gap 175.

By this configuration, the air inside the cooking space 40 may be prevented from flowing back to the guide member 156 through the overflow member 174 while the air guided through the guide member 156 is discharged to the cooking space 40 through the overflow member 174. Air to flow back to the inside of the dispersion unit 140 from the first cooking space 41 may be interrupted by the pressure of air discharged from the inside of the dispersion unit 140 and the overflow rib 176.

The overflow member 174 may include a first overflow member 174a that is formed along at least a part of the periphery of the first guide member 156a and a second overflow member 174b that is formed along at least a part of the periphery of the second guide member 156b. In addition, the overflow member 174 may further include a third overflow member 174c that is formed along at least a part of the periphery of the dispersion member 152. The configuration of the gas oven 1 is described.

Hereinafter, the operation of the gas oven 1 will be described. There are various cooking methods depending on a heating method. Specifically, as various cooking methods, there are "broiling" or "grilling" in which a cooked object is directly heated by a flame, "baking" in which a cooked object is heated by heated air, and the like. The gas oven 1 may provide "broiling" and "baking" using the first burner 61 and "baking" using the second burner 62 to a user. For example, when the divider 43 is removed from the cooking space 40, the gas oven 1 may provide "broiling" or "baking" in the cooking space 40. In addition, when the divider 43 is mounted in the cooking space 40, the gas oven 1 may provide "broiling" or "baking" in the first cooking space 41, and "baking" in the second cooking space 42. Specifically, the gas oven 1 may heat a cooked object accommodated in the cooking space 40 by controlling the first burner 61, the second burner 62, the first convection unit 51, and the second convection unit 52 depending on a control command of a user, whether the divider 43 is mounted, and the temperature of the cooking space 40.

When a user inputs a baking command without mounting the divider 43 in the cooking space 40, the gas oven 1 may operate the second burner 62, the first convection unit 51, and the second convection unit 52 depending on the temperature inside the cooking space 40. Specifically, when the temperature of the cooking space 40 is lower than a cooking temperature set by the user, the gas oven 1 may operate the second burner 62, and when the temperature of the cooking space 40 is the cooking temperature set by the user or higher, the gas oven 1 may stop the operation of the second burner 62.

In addition, when the user inputs a broiling command without mounting the divider 43 in the cooking space 40, the gas oven 1 may operate the first burner 61, the first convection unit 51, and the second convection unit 52 depending on the temperature inside the cooking space 40. Specifically, when the temperature of the cooking space 40 is lower than a cooking temperature set by the user, the gas oven 1 may operate the first burner 61, and when the temperature of the cooking space 40 is the cooking temperature set by the user or higher, the gas oven 1 may stop the operation of the first burner 61.

In addition, when the user mounts the divider 43 in the cooking space 40 and inputs a baking command for the second cooking space 42, the gas oven 1 may operate the second burner 62 and the second convection unit 52 depending on the temperature inside the second cooking space 42. Specifically, when the temperature of the second cooking space 42 is lower than a cooking temperature set by the user, the gas oven 1 may operate the second burner 62, and when the temperature of the second cooking space 42 is the cooking temperature set by the user or higher, the gas oven 1 may stop the operation of the second burner 62.

In addition, when the user mounts the divider 43 in the cooking space 40 and inputs a broiling command for the first cooking space 41, the gas oven 1 may operate the first burner 61 and the first convection unit 51 depending on the temperature inside the first cooking space 41. Specifically, when the temperature of the first cooking space 41 is lower than a cooking temperature set by the user, the gas oven 1 may operate the first burner 1, and when the temperature of the first cooking space 41 is the cooking temperature set by the user or higher, the gas oven 1 may stop the operation of the first burner 61.

In addition, when the user mounts the divider 43 in the cooking space 40 and inputs a baking command for the first cooking space 41, the gas oven 1 may operate the first burner 61 and the first convection unit 51 depending on the temperature inside the first cooking space 41 detected by the first temperature sensor 81. The baking in the first cooking space 41 will be described in detail.

Figure 11:
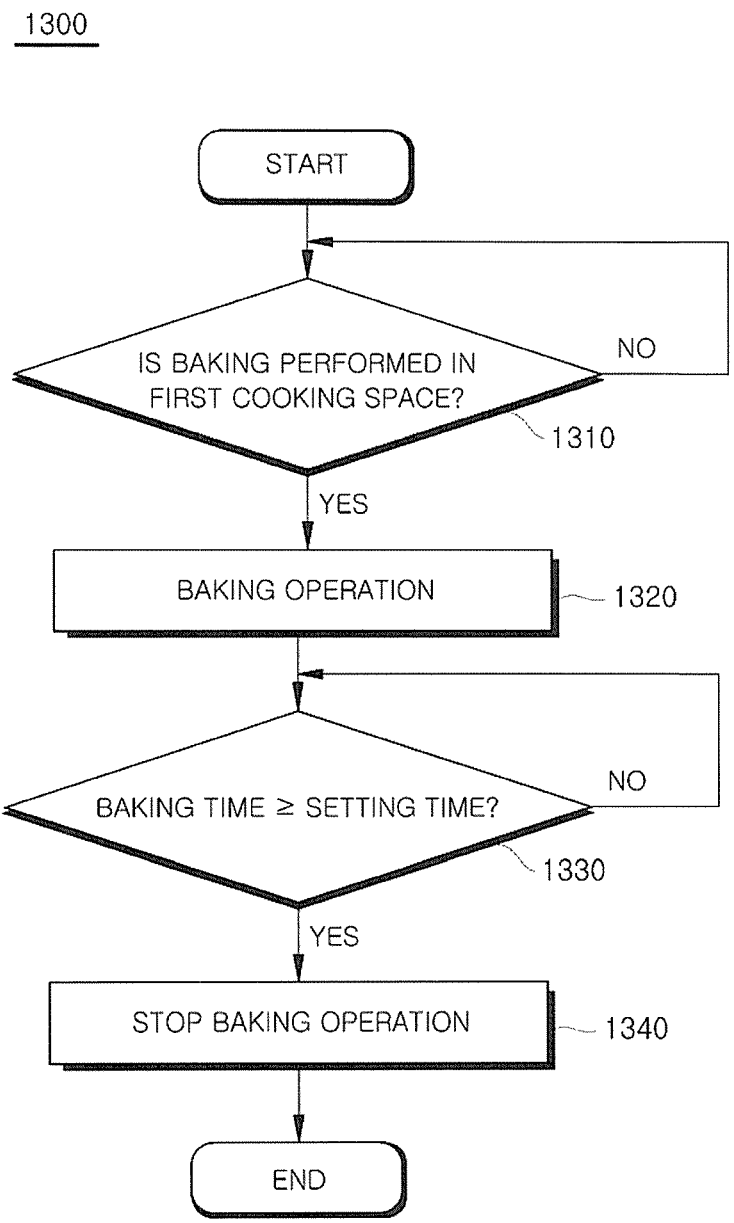
FIG. 11 illustrates an example of a heating operation of a gas oven in accordance with an embodiment of the disclosure.

FIG. 11 illustrates an example of a heating operation of a gas oven in accordance with an embodiment of the disclosure. With reference to FIG. 11, an example 1300 of the heating operation of the gas oven 1 will be described. In operation 1310, the gas oven 1 determines whether a baking command of the first cooking space 41 is input. The control unit 200 of the gas oven 1 determines whether the baking command of the first cooking space 41 is input from the user interface 11. A user may input the baking command of the first cooking space 41 through the input buttons 11a of the user interface 11, and the user interface 1 having received the baking command of the first cooking space 41 from the user may transmit an electrical signal corresponding to the baking command of the first cooking space 41 to the control unit 200.

When the baking command of the first cooking space 41 is not input (NO of operation 1310), the gas oven 1 may continue the existing operation. In addition, in operation 1320, when the baking command of the first cooking space 41 is input (YES of operation 1310), the gas oven 1 performs a baking operation of the first cooking space 41. The gas oven 1 may intermittently operate the first burner 61 during the baking operation of the first cooking space 41.

The baking operation of the first cooking space 41 will be described in detail. In operation 1330, the gas oven 1 determines whether a baking time is a cooking time set by a user or longer during the baking operation. The control unit 200 of the gas oven 1 may count a bake-heating time after the start of the baking of the first cooking space 41, and compare the baking time and the set cooking time. In addition, the control unit 200 determines whether the baking time is the set cooking time or longer. When the baking time is shorter than the set cooking time (NO of operation 1330), the gas oven 1 continues the baking of the first cooking space 1.

In addition, in operation 1340, when the baking time is the set cooking time or longer (YES of operation 1330), the gas oven 1 stops the baking of the first cooking space 41. As described, the gas oven 1 may perform baking of the first cooking space 41 during the cooking time set by the user. Hereinafter, the baking of the first cooking space 41 will be described.

Figure 12A:
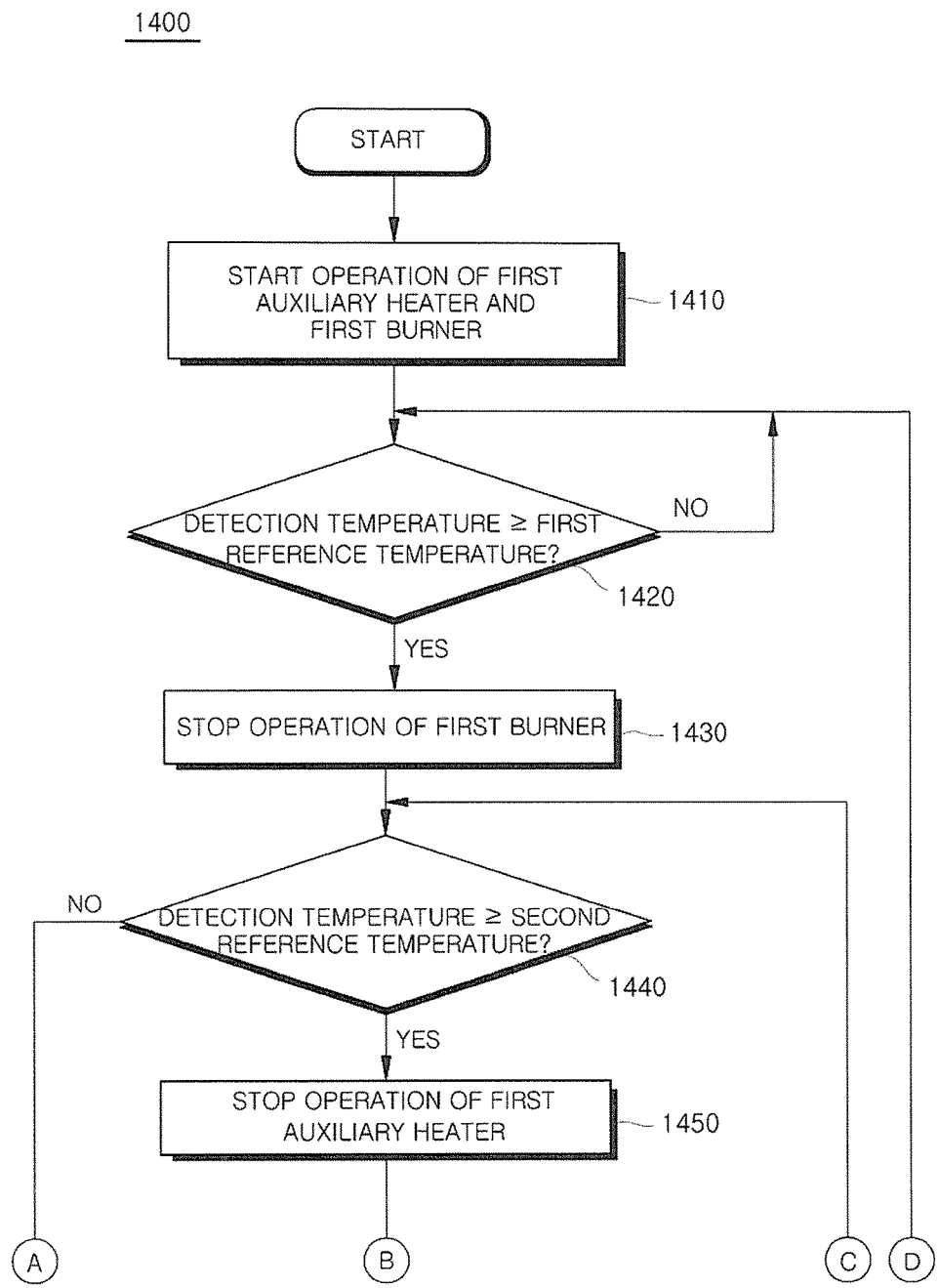
FIGS. 12*a* and 12*b* are an example of a baking operation of a gas oven in accordance with an embodiment of the disclosure.
Figure 12B:
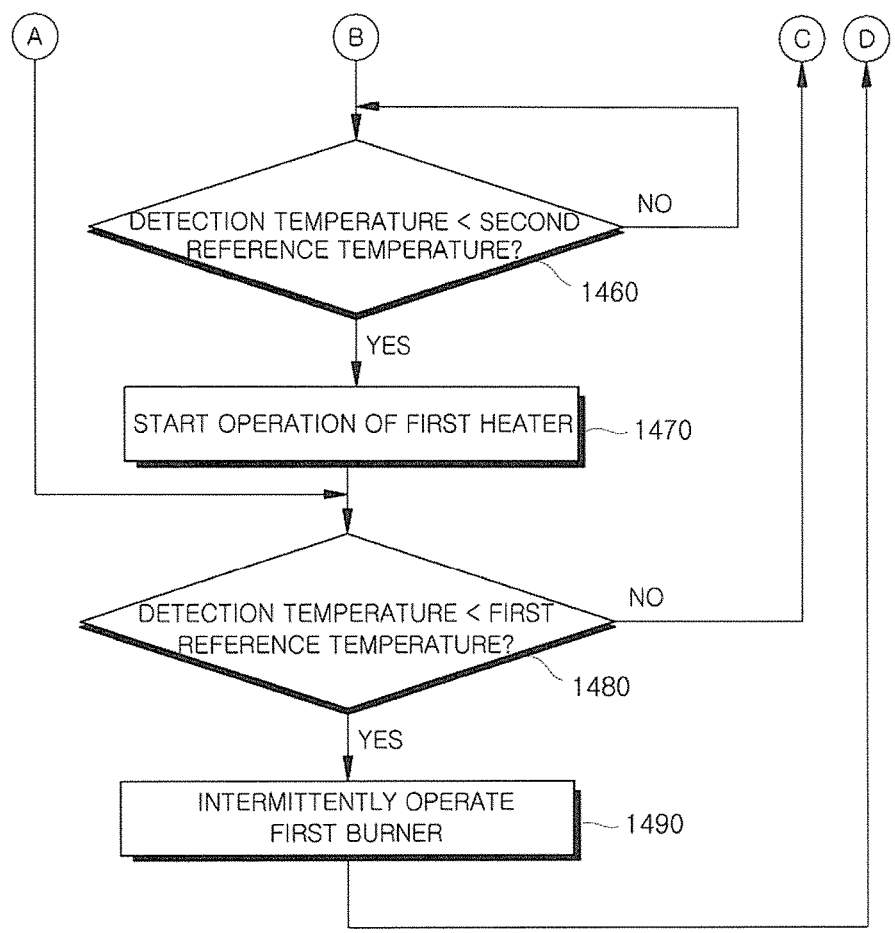
Figure 13:
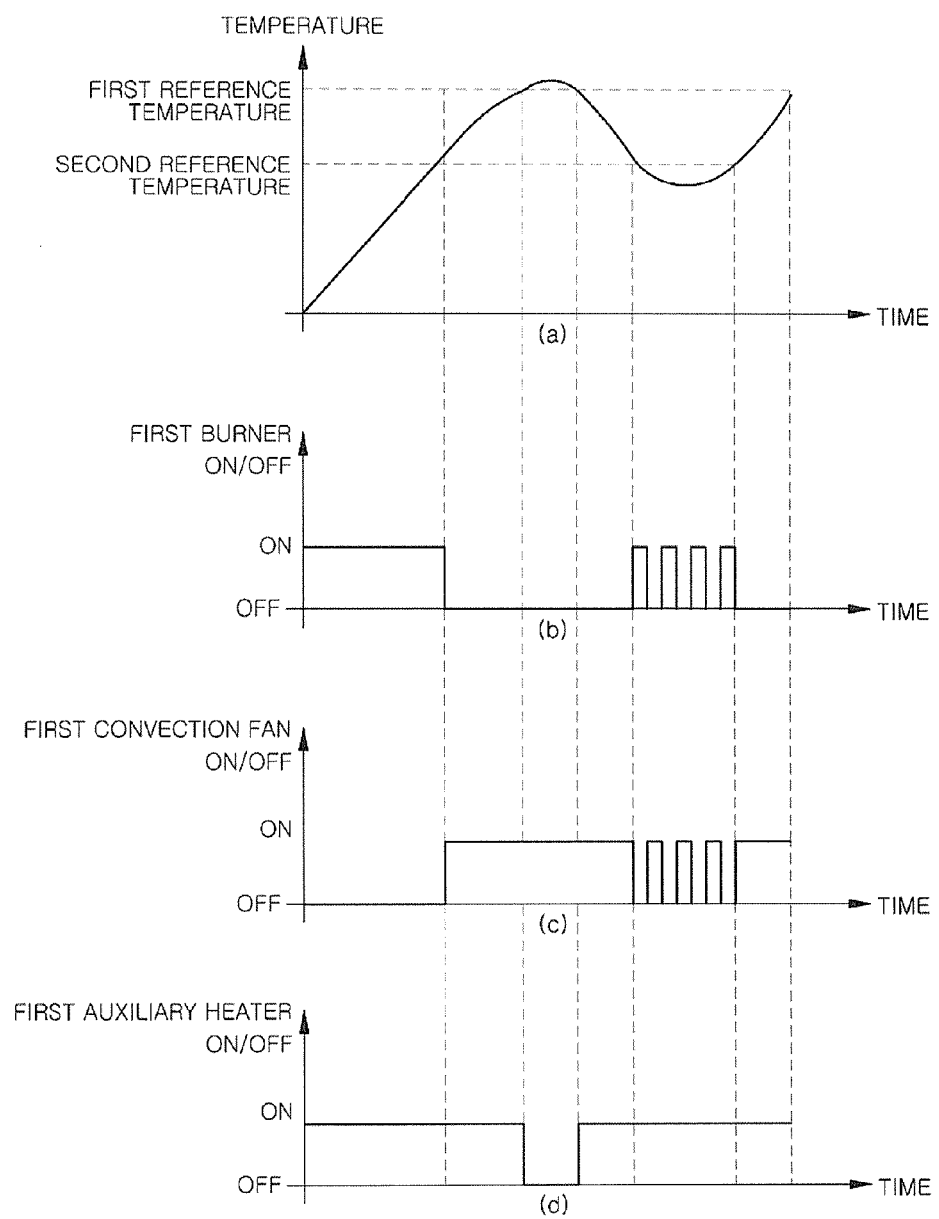
FIG. 13 illustrates operations of a first burner, a first heater, and a first convention fan by the baking operation illustrated in FIGS. 12*a* and 12*b*.

FIGS. 12a and 12b are an example of a baking of a gas oven in accordance with an embodiment of the disclosure, and FIG. 13 illustrates operations of a first burner, a first heater, and a first convention fan by the baking illustrated in FIGS. 12a and 12b. With reference to FIGS. 12a to 13, a baking 1400 of the first cooking space 41 of the gas oven 1 will be described. In operation 1410, when the baking 1400 of the first cooking space 41 is started, the gas oven 1 operates the first auxiliary heater 51a and the first burner 61. The control unit 200 of the gas oven 1 may supply power to the first auxiliary heater 51a, and ignite the first burner 61. In addition, the control unit 200 may operate the auxiliary air supply unit 100 in order to supply air to the first burner 61. When the first auxiliary heater 51a and the first burner 61 are operated, the temperature of the first cooking space 41 increases as illustrated in (a) of FIG. 13. In this manner, by continuously operating the first burner 61, the gas oven 1 may perform a pre-heating operation for pre-heating the first cooking space 41.

In operation 1420, the gas oven 1 determines whether a detection temperature of the first cooking space 41 is a first reference temperature or higher during the operation of the first auxiliary heater 51a and the first burner 61. Here, the first reference temperature may be a cooking temperature set through the user interface 11 by the user. The control unit 200 of the gas oven 1 may receive the detection temperature of the first cooking space 41 from the first temperature sensor 81. In addition, the control unit 200 may compare the detection temperature and the first reference temperature, and determine whether the detection temperature of the first cooking space 41 is the first reference temperature or higher. When the detection temperature of the first cooking space 41 is determined to be lower than the first reference temperature (NO of operation 1420), the gas oven 1 continues the operation of the first auxiliary heater 51a and the first burner 61.

In operation 1430, when the detection temperature of the first cooking space 41 is determined to be the first reference temperature or higher (YES of operation 1420), the gas oven 1 stops the operation of the first burner 61. When the detection temperature received from the first temperature sensor 81 is the first reference temperature or higher, the control unit 200 closes the first burner valve 61*a*. Even when the operation of the first burner 61 is stopped, the temperature of the first cooking space 41 continues to increase as illustrated in (a) of FIG. 13 while it does not abruptly decrease. However, when the operation of the first burner 61 is stopped, the increase rate of the temperature of the first cooking space 41 is gradually reduced. In this manner, when the temperature of the first cooking space 41 is the first reference temperature or higher, the gas oven 1 may perform a heating-stop operation for stopping the operation of the first burner 61. When the operation of the first burner 61 is stopped, the control unit 200 may operate the first convection fan 51*b* so as to circulate air inside the first cooking space 41 as illustrated in (c) of FIG. 13.

In operation 1440, the gas oven 1 determines whether the detection temperature of the first cooking space 41 is a second reference temperature or higher during the operation of the first auxiliary heater 51*a*. Here, the second reference temperature may be a temperature higher than the first reference temperature (the cooking temperature set by the user). For example, the second reference temperature may be a temperature higher than the first reference temperature by approximately 10 degrees Celsius (20 degrees Fahrenheit). The control unit 200 may compare the detection temperature received from the first temperature sensor 81 and the second reference temperature, and determine whether the detection temperature of the first cooking space 41 is the second reference temperature or higher.

When the detection temperature of the first cooking space 41 is determined to be lower than the second reference temperature (NO of operation 1440), the gas oven 1 continues the operation of the first auxiliary heater 51*a*. In addition, as is described, the gas oven 1 determines whether the detection temperature of the first cooking space 41 is lower than the first reference temperature. This is because the temperature of the first cooking space 41 may decrease without reaching the second reference temperature. In operation 1450, when the detection temperature of the first cooking space 41 is determined to be the second reference temperature or higher (YES of operation 1440), the gas oven 1 stops the operation of the first auxiliary heater 51*a*. The control unit 200 may stop the power supply of the first auxiliary heater 51*a*.

Even when the operation of the first burner 61 is stopped as described, the temperature of the first cooking space 41 continues to increase to reach the second reference temperature. When the temperature of the first cooking space 41 reaches the second reference temperature, the control unit 200 stops the operation of the first auxiliary heater 51*a* so that the temperature of the first cooking space 41 may decrease. When the operation of the first auxiliary heater 51*a* is stopped, the increase rate of the temperature of the first cooking space 41 is further reduced as illustrated in (a) of FIG. 13, so that the temperature of the first cooking space 41 may decrease.

In operation 1460, the gas oven 1 determines whether the detection temperature of the first cooking space 41 is lower than the second reference temperature while the operation of the first auxiliary heater 51*a* is stopped. The control unit 200 may compare the detection temperature received from the first temperature sensor 81 and the second reference temperature, and determine whether the detection temperature of the first cooking space 41 is lower than the second reference temperature. When the detection temperature of the first cooking space 41 is determined to be the second reference temperature or higher (NO of operation 1460), the gas oven 1 continues to compare the detection temperature of the first cooking space 41 and the second reference temperature. In operation 1470, when the detection temperature of the first cooking space 41 is determined to be lower than the second reference temperature (YES of operation 1460), the gas oven 1 operates the first auxiliary heater 51*a*. The control unit 200 may supply power to the first auxiliary heater 51*a* so as to operate the first auxiliary heater 51*a*.

As illustrated in (a) of FIG. 13, even though the first auxiliary heater 51*a* is operated, the temperature of the first cooking space 41 does not necessarily increase. As described, the quantity of heat generated by the first auxiliary heater 51*a* is relatively small, and therefore the first auxiliary heater 51*a* may assist the first burner 61. However, when the first auxiliary heater 51*a* is operated, the decrease rate of the temperature of the first cooking space 41 is reduced.

In operation 1480, the gas oven 1 determines whether the detection temperature of the first cooking space 41 is lower than the first reference temperature while only the first auxiliary heater 51*a* is operated. Specifically, the control unit 200 may compare the detection temperature received from the first temperature sensor 81 and the first reference temperature, and determine whether the detection temperature of the first cooking space 41 is lower than the first reference temperature. In addition, as described above in operation 1440, when the detection temperature of the first cooking space 41 is determined to be lower than the second reference temperature (NO of operation 1440), the gas oven 1 may determine whether the detection temperature of the first cooking space 41 is lower than the first reference temperature. This is because the temperature of the first cooking space 41 may decrease without reaching the second reference temperature.

When the detection temperature of the first cooking space 41 is determined to be the first reference temperature or higher (NO of operation 1480), the gas oven 1 determines again whether the detection temperature of the first cooking space 41 is the second reference temperature or higher. In this instance, the first auxiliary heater 51*a* of the gas oven 1 is operated, and the first burner 61 is not operated. In operation 1490, when the detection temperature of the first cooking space 41 is determined to be lower than the first reference temperature (YES of operation 1480), the gas oven 1 intermittently operates the first burner 61. The control unit 200 repeatedly opens and closes the first burner valve 61*a*. For example, as illustrated in (b) of FIG. 13, the control unit 200 may repeatedly perform an operation of opening the first burner valve 61*a* for 30 seconds and closing the first burner valve 61*a* for 60 seconds.

The reason to intermittently operate the first burner 61 is to implement "baking". When the first burner 61 directly heating a cooked object is continuously operated, the outer surface of the cooked object is blackened. As a result, "baking" desired by a user fails to be implemented, and "broiling" is implemented. In order to heat the cooked object while preventing the outer surface of the cooked object from being blackened, the gas oven 1 intermittently operates the first burner 61. In addition, in order to minimize the operation time of the first burner 61, the gas oven 1 operates the first auxiliary heater 51*a*.

In addition, the control unit 200 may intermittently operate the first convection fan 51*b* while the first burner 61 is intermittently operated. For example, as illustrated in (c) of FIG. 13, when the first burner 61 is operated, the control unit 200 may stop the operation of the first convection fan 51*b*, and when the first burner 61 is not operated, the control unit 200 may operate the first convection fan 51b. However, the operation of the first convection fan 51b is not limited thereto, and the control unit 200 may stop the operation of the first convection fan 51b while the first burner 61 is intermittently operated. When the first burner 61 is intermittently operated, the temperature of the first cooking space 41 increases as illustrated in (a) of FIG. 13.

In operation 1420, the gas oven 1 determines again whether the detection temperature of the first cooking space 41 is the first reference temperature or higher while the first burner 61 is intermittently operated. In this manner, the gas oven 1 repeatedly performs an operation of operating the first burner 61 and the first auxiliary heater 51a and stopping the operation of the first burner 61 and the first auxiliary heater 51a depending on the temperature of the first cooking space 41 during the baking operation.

In addition, the gas oven 1 may minimize the cooked object from being directly heated by the first burner 61 by intermittently operating the first burner 61 during the baking operation of the first cooking space 41. The heating operation of the gas oven 1 using the first burner 61 and the second burner 62 is described. Hereinafter, an air supply control operation of the gas oven 1 using the auxiliary air supply unit 100 will be described. As described, for the purpose of the combustion of the first burner 61, the gas oven 1 supplies refreshed air to the first burner 61 and the first cooking space 41 from the outside using the auxiliary air supply unit 100.

Figure 14:
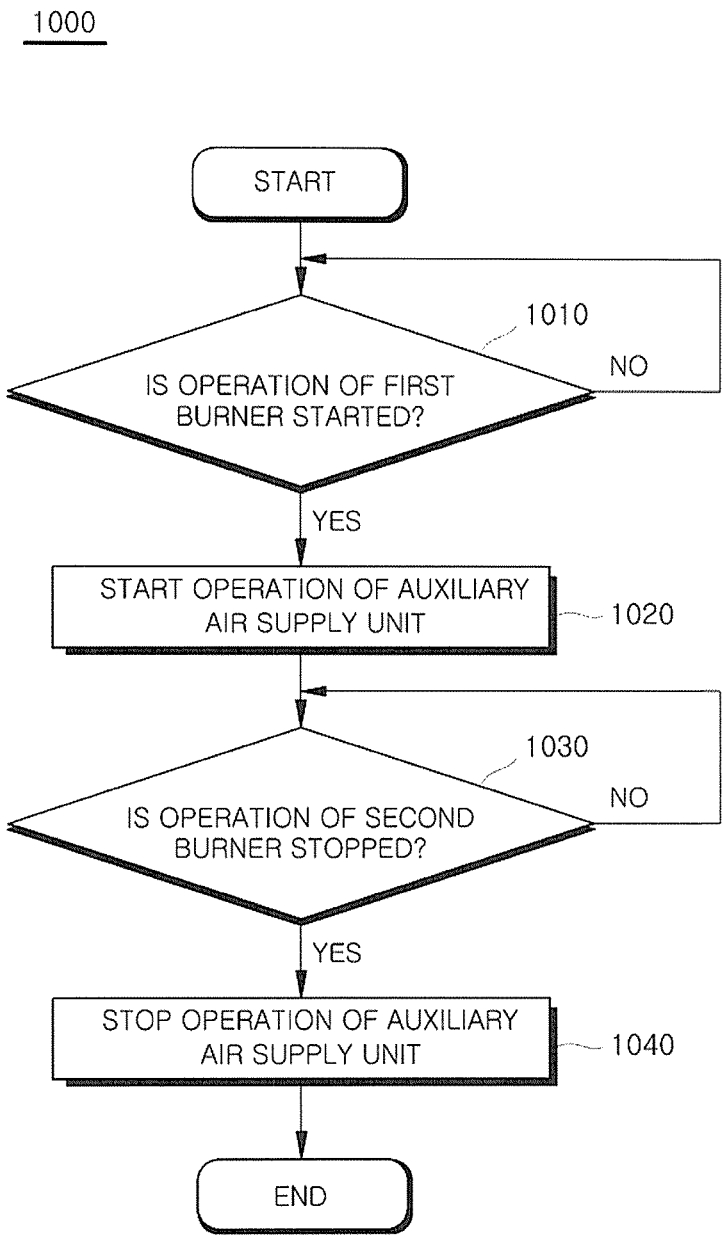
FIG. 14 illustrates an example of an air supply control operation of a gas oven in accordance with an embodiment of the disclosure.
Figure 15:
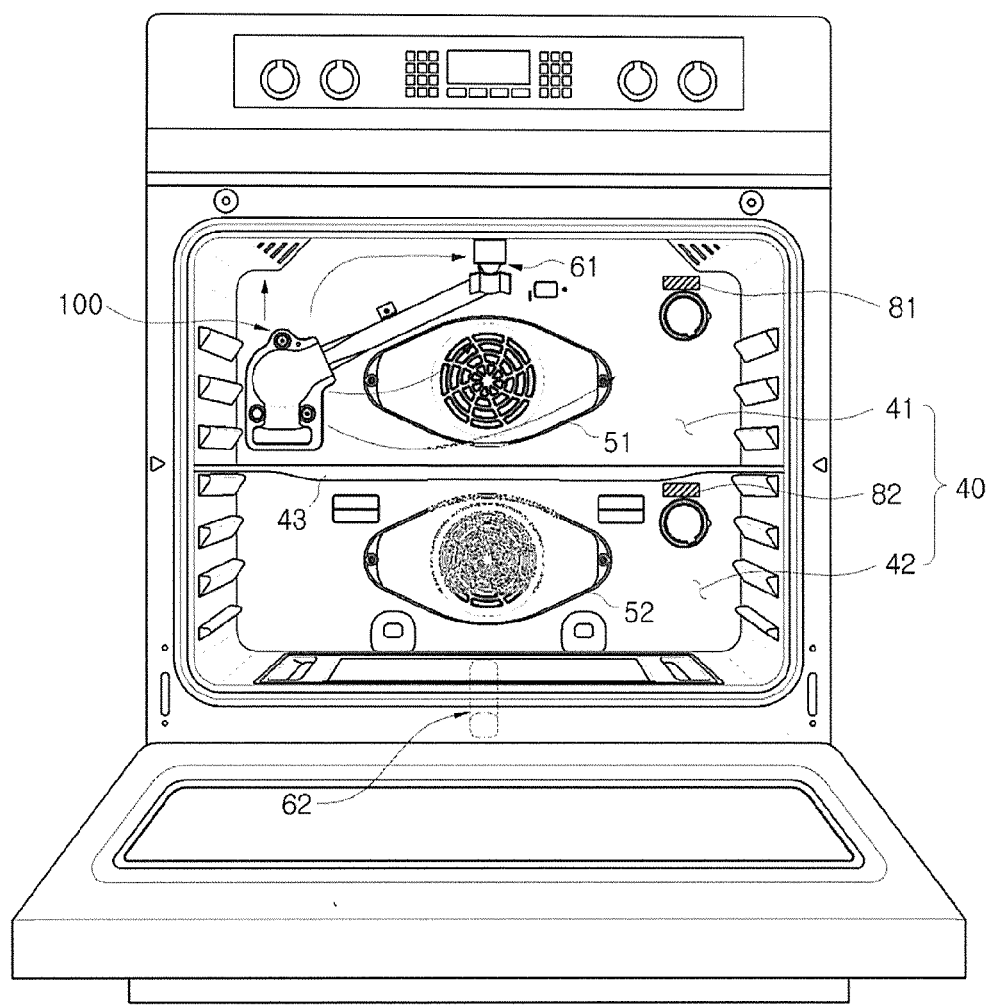
FIGS. 15 and 16 illustrate the flow of air by the air supply control operation illustrated in FIG. 14.
Figure 16:
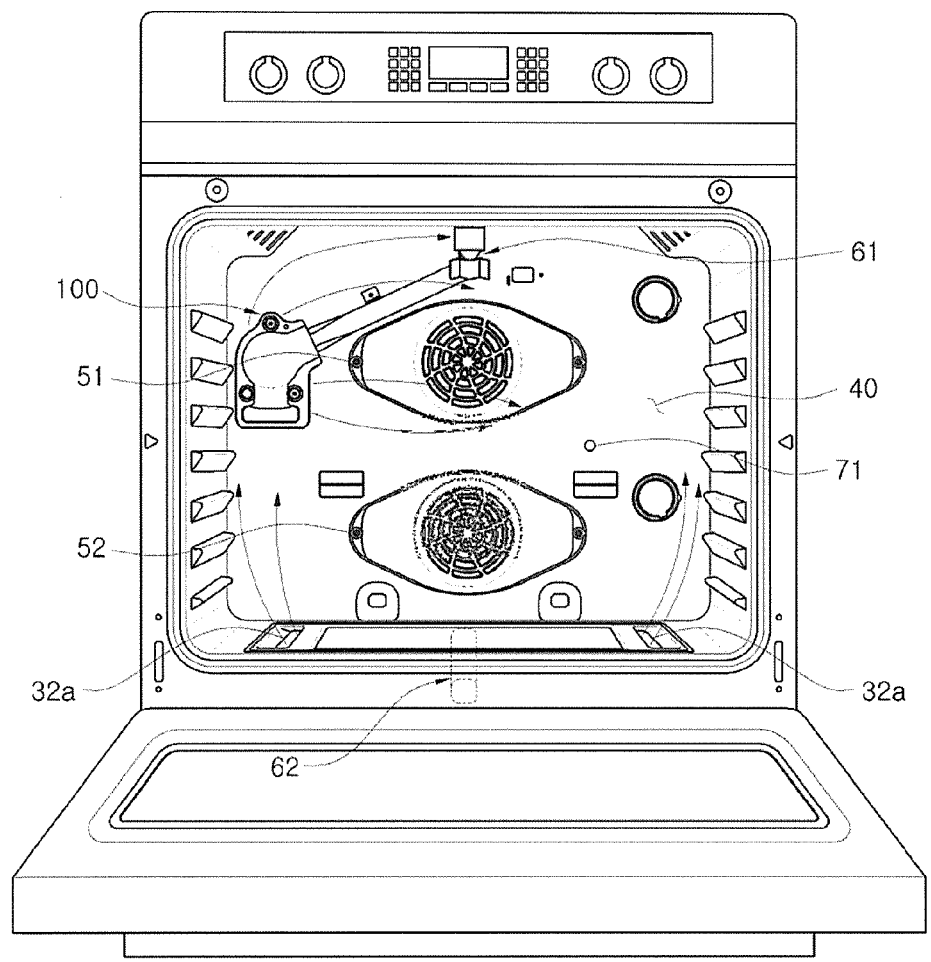

FIG. 14 illustrates an example of an air supply control operation of a gas oven in accordance with an embodiment of the disclosure, and FIGS. 15 and 16 illustrate the flow of air by the air supply control operation illustrated in FIG. 14. With reference to FIGS. 14 to 16, an example 1000 of the air supply control operation of the gas oven is described.

In operation 1010, the gas oven 1 determines whether the operation of the first burner 61 is started. The control unit 200 of the gas oven 1 may determine whether the operation of the first burner 61 is started depending on a control command of a user, whether the divider 43 is mounted, and the temperature of the cooking space 40. For example, when a "divider mounting signal" is input from the divider detection unit 70 and a cooking command (broiling command or baking command) for the first cooking space 41 is input from the user interface 11, the control unit 200 may open the first burner valve 61a and determine that the operation of the first burner 61 is started. In addition, when a "divider removal signal" is input from the divider detection unit 70 and a "broiling command" is input from the user interface 11, the control unit 200 may open the first burner valve 61a and determine that the operation of the first burner 61 is started.

In addition, when the temperature of the first cooking space 41 decreases to a cooking temperature set by a user or lower, the control unit 200 may open the first burner valve 61a and determine that the operation of the first burner 61 is started. When it is determined that the operation of the first burner 61 is not started (NO of operation 1010), the gas oven 1 continues the existing operation. In addition, in operation 1020, when it is determined that the operation of the first burner 61 is started (YES of operation 1010), the gas oven 1 operates the auxiliary air supply unit 100.

The control unit 200 of the gas oven 1 may transmit an "auxiliary air supply fan operating signal" for rotating the auxiliary air supply fan 120 to the auxiliary air supply unit 100. For example, the control unit 200 may supply a voltage of 12 volts to an air supply fan motor of the auxiliary air supply fan 120 in order to rotate the auxiliary air supply fan 120. In addition, the control unit 200 may rotate the auxiliary air supply fan 120 at a low speed (approximately 1600 rpm, which may vary according to the size of the auxiliary air supply fan) during the operation of the auxiliary air supply unit 100, and rotate the auxiliary air supply fan 120 at a high speed (approximately 2600 rpm, which may vary according to the size of the auxiliary air supply fan) when a predetermined time has elapsed. For example, the control unit 200 may supply a voltage of 8 volts to the auxiliary air supply fan 120 during the operation of the auxiliary air supply unit 100, and supply a voltage of 12 volts to the auxiliary air supply fan 120 when a predetermined time has elapsed.

When the divider 43 is mounted and the first burner 61 is operated, the control unit 200 may operate the auxiliary air supply fan 120 so as to supply air to the first burner 61 and the first cooking space 41. As a result, as illustrated in FIG. 15, air may be supplied from the auxiliary air supply unit 100 to the first burner 61 and the first cooking space 41. In other words, primary air may be supplied from the auxiliary air supply unit 100 to the first burner 61, and secondary air may be supplied from the auxiliary air supply unit 100 to the first cooking space 41.

In addition, when the divider 43 is removed and the first burner 61 and the second burner 62 are operated, the control unit 200 may operate the auxiliary air supply fan 120 so as to supply air to the first burner 61 and the cooking space 40. As a result, as illustrated in FIG. 16, air may be supplied from the auxiliary air supply unit 100 to the first burner 61 and the cooking space 40. In particular, the air supplied from the cooking space 40 may prevent waste gas discharged from the second burner 62 from flowing to the first burner 61 and allow the first burner 61 to be smoothly operated.

Next, in operation 1030, the gas oven 1 determines whether the operation of the first burner 61 is stopped. The control unit 200 of the gas oven 1 may determine whether the operation of the first burner 61 is stopped depending on a control command of a user, a cooking time set by the user, or the temperature of the cooking space 40. For example, when a cooking stop command is input from the user interface 11, the control unit 200 may close the first burner valve 61a and determine that the operation of the first burner 61 is stopped.

In addition, when the cooking time set by the user has elapsed, the control unit 200 may close the first burner valve 61a and determine that the operation of the first burner 61 is stopped. In addition, when the temperature of the cooking space 40 increases to the cooking temperature set by the user or higher, the control unit 200 may close the first burner valve 61a and determine that the operation of the first burner 61 is stopped. When it is determined that the operation of the first burner 61 is not stopped (NO of operation 1030), the gas oven 1 continues the cooking operation with respect to the cooked object and the air supply control operation.

In addition, in operation 1040, when it is determined that the operation of the first burner 61 is stopped (YES of operation 1030), the gas oven 1 stops the operation of the auxiliary air supply unit 100. The control unit 200 of the gas oven 1 may transmit an "auxiliary air supply fan stopping signal" for stopping the rotation of the auxiliary air supply fan 120 to the auxiliary air supply unit 100. For example, the control unit 200 may supply a voltage of 0 volts to the auxiliary air supply fan 120.

This is to prevent the occurrence of flash back in the first burner 61. The flash back means that the flame of the first burner 61 enters into the first burner 61 while losing stability. When such flash back occurs, noise called "fire extinguishing sound" is generated in the first burner 61. Such noise may cause discomfort to the user, and therefore in order to prevent flash back, the gas oven 1 stops the operation of the auxiliary air supply unit 100 simultaneously with stopping of the operation of the first burner 61. However, it is not limited to immediately stopping the operation of the auxiliary air supply unit 100 when the first burner 61 is extinguished, and the control unit 200 may operate the auxiliary air supply unit 100 during a predetermined time after the operation of the first burner 61 is stopped.

As described, the gas oven 1 may operate the auxiliary air supply unit 100 depending on whether the first burner 61 is operated so that the first burner 61 is smoothly operated. As described, when air for the combustion of the first burner 61 is supplied using the auxiliary air supply unit 100, the combustion of the second burner 62 may be interrupted. In order to prevent this, the gas oven 1 may adjust the rotational speed of the auxiliary air supply fan 120.

Figure 17:
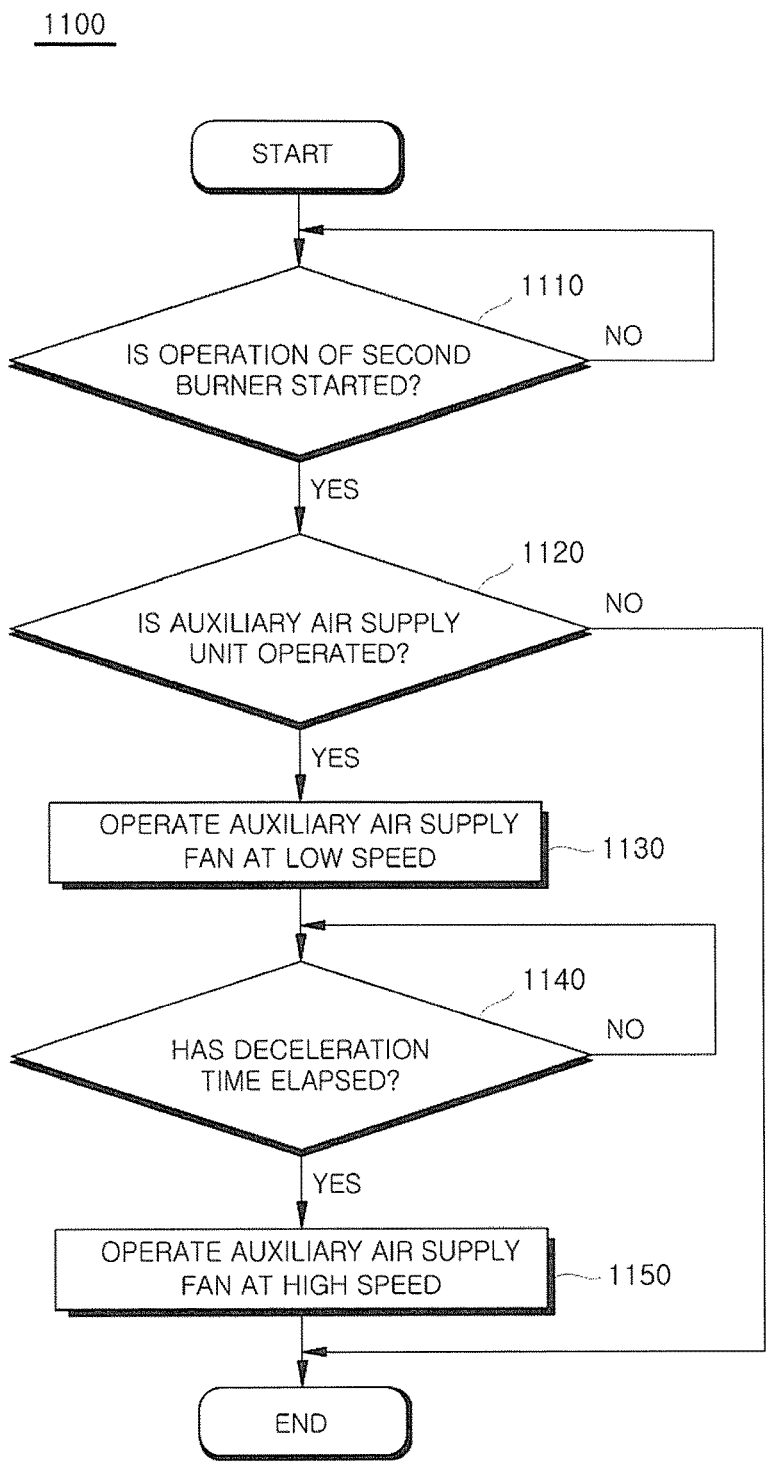
FIG. 17 illustrates another example of an air supply control operation of a gas oven in accordance with an embodiment of the disclosure.
Figure 18:
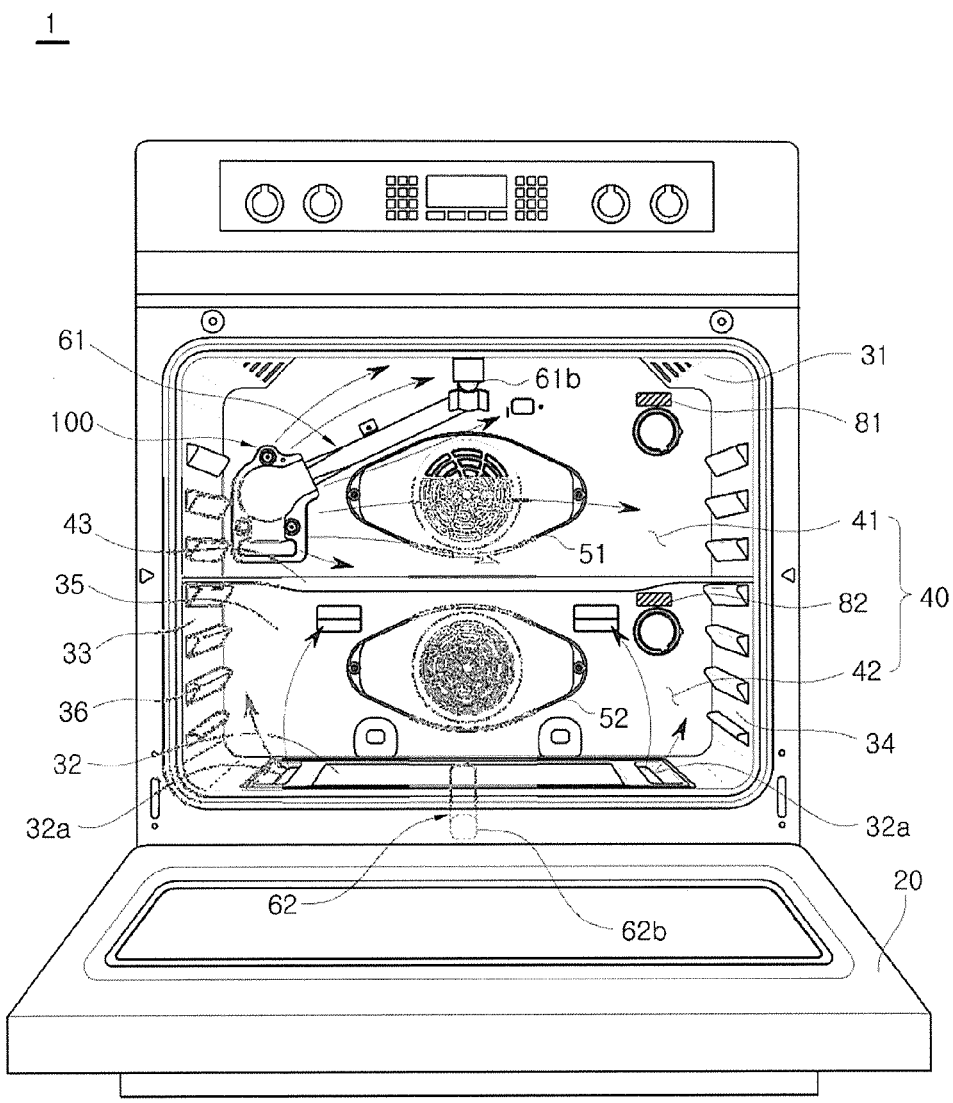
FIGS. 18 and 19 illustrate the flow of air by the air supply control operation illustrated in FIG. 17.
Figure 19:
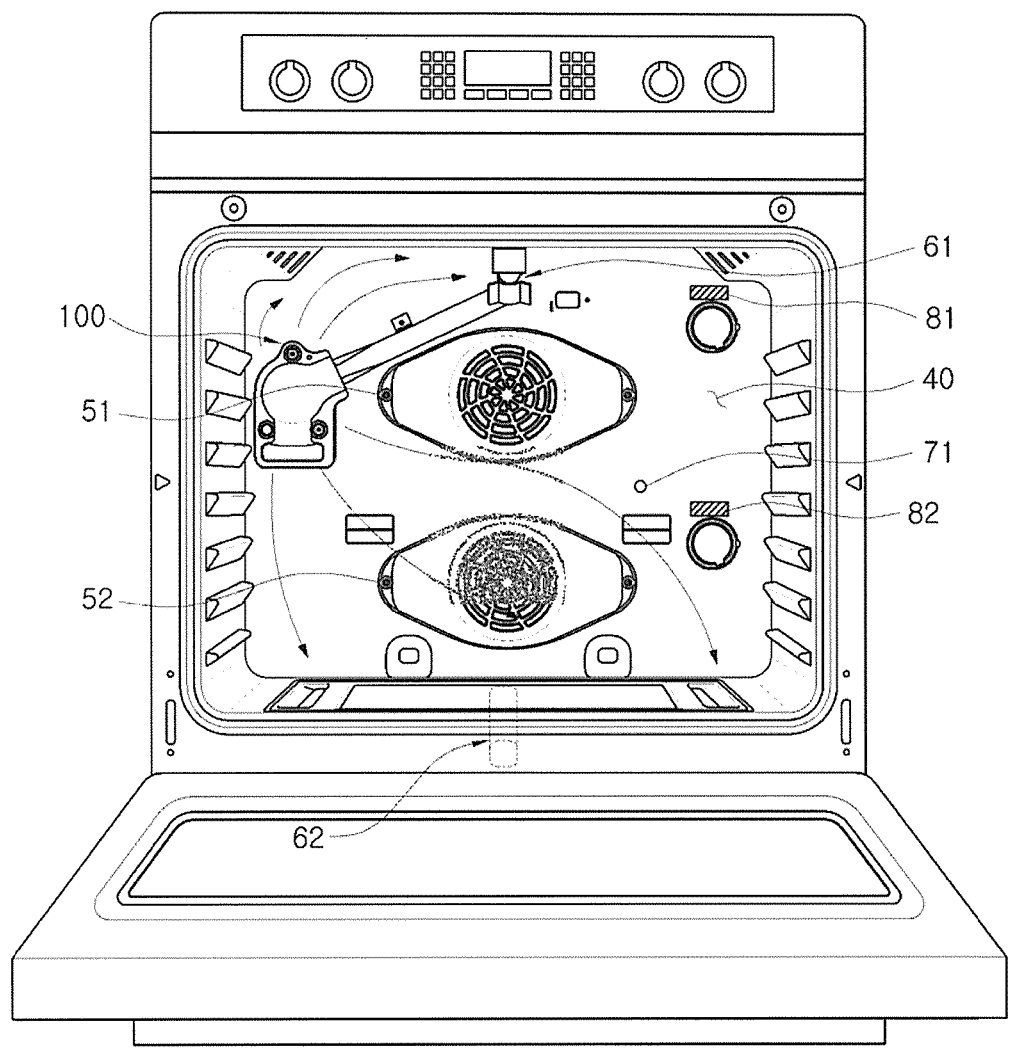
Figure 20:
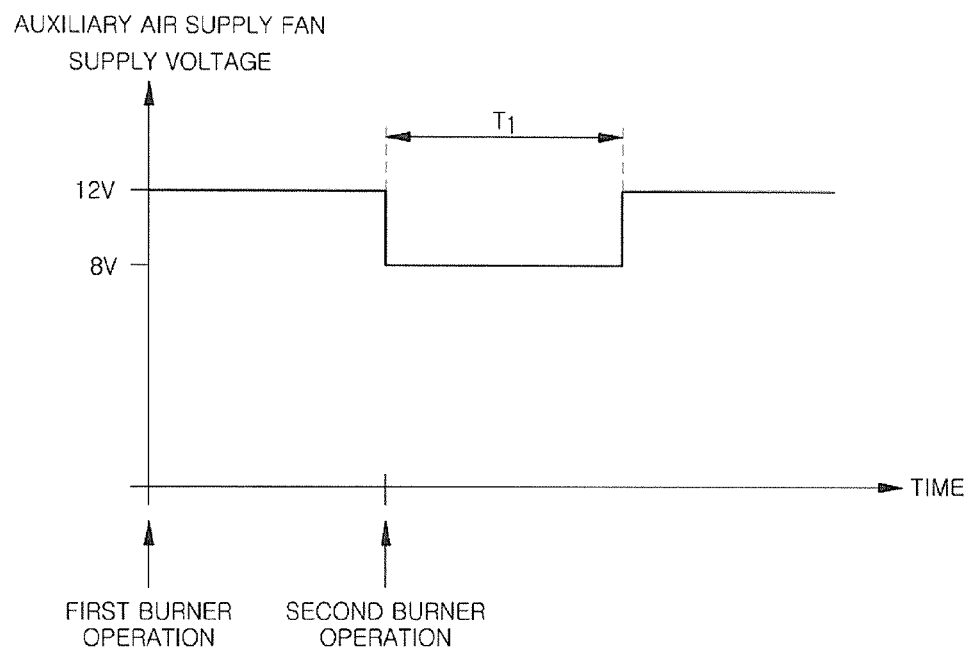
FIG. 20 illustrates a change in a voltage supplied to an auxiliary air supply fan in accordance with the air supply control operation illustrated in FIG. 17.

FIG. 17 illustrates another example of an air supply control operation of a gas oven in accordance with an embodiment of the disclosure. FIGS. 18 and 19 illustrate the flow of air by the air supply control operation illustrated in FIG. 17. FIG. 20 illustrates a change in a voltage supplied to an auxiliary air supply fan in accordance with the air supply control operation illustrated in FIG. 17.

With reference to FIGS. 17 to 20, another example 1100 of the air supply control operation of the gas oven is described. In operation 1110, the gas oven 1 determines whether the operation of the second burner 62 is started. The control unit 200 of the gas oven 1 may determine whether the operation of the second burner 62 is started depending on a control command of a user and whether the divider 43 is mounted. For example, when a "divider mounting signal" is input from the divider detection unit 70 and a baking command is input from the user interface 11, the control unit 200 may open the second burner valve 62a and determine that the operation of the second burner 62 is started. When a "divider removal signal" is input from the divider detection unit 70 and the baking command is input from the user interface 11, the control unit 200 may open the second burner valve 62a and determine that the operation of the second burner 62 is started.

In addition, the control unit 200 may determine whether the operation of the second burner 62 is started depending on the temperature of the second cooking space 42. As described, when the baking command for the second cooking space 42 is input, the gas oven 1 operates the second burner 62. Next, when the temperature of the second cooking space 42 is the cooking temperature set by the user or higher, the gas oven 1 stops the operation of the second burner 62, and when the temperature of the second cooking space 42 is lower than the cooking temperature set by the user, the gas oven 1 re-operates the second burner 62. In this manner, when the operation of the second burner 62 is stopped and then the temperature of the second cooking space 42 is lower than the set cooking temperature, the control unit 200 may open the second burner valve 62a and determine that the operation of the second burner 62 is started.

When it is determined that the operation of the second burner 62 is not started (NO of operation 1110), the gas oven 1 continues the existing operation. In addition, in operation 1120, when it is determined that the operation of the second burner 62 is started (YES of operation 1110), the gas oven 1 determines whether the auxiliary air supply unit 100 is operated. The control unit 200 of the gas oven 1 may determine whether the auxiliary air supply unit 100 is operated in various methods. For example, the control unit 200 may determine whether the auxiliary air supply unit 100 is operated based on a control signal provided from the auxiliary air supply unit 100. Specifically, when an "auxiliary air supply fan operating signal" is transmitted to the auxiliary air supply unit 100, the control unit 200 may determine that the auxiliary air supply unit 100 is operated, and when an "auxiliary air supply fan stopping signal" is transmitted to the auxiliary air supply unit 100, the control unit 200 may determine that the auxiliary air supply unit 100 is not operated. In addition, the control unit 200 may determine whether the auxiliary air supply unit 100 is operated depending on whether the first burner 61 is operated.

Specifically, when the first burner valve 61a is opened, the control unit 200 may determine that the auxiliary air supply unit 100 is operated, and when the first burner valve 61a is closed, the control unit 200 may determine that the auxiliary air supply unit 100 is not operated. In addition, the control unit 200 may determine whether the first burner 61 is operated in consideration of operation information of the first burner 61 stored in the memory 220. The control unit 200 may store the operation information of the first burner 61 in the memory 220. For example, the control unit 200 may store the operation information of the first burner 61 in the memory 220 when the operation of the first burner 61 is started, and store the stop information of the operation of the first burner 61 in the memory 220 when the operation of the first burner 61 is stopped.

When it is determined that the auxiliary air supply unit 100 is not operated (NO of operation 1120), the gas oven 1 terminates the air supply control operation 1110. In addition, in operation 1130, when it is determined that the auxiliary air supply unit 100 is operated (YES of operation 1120), the gas oven 1 reduces the rotational speed of the auxiliary air supply fan 120. As described, waste gas containing carbon monoxide (CO) and carbon dioxide ($CO_2$) is generated at the time of combustion. In particular, at the time of initial combustion in which a flame is generated, waste gas containing a large amount of carbon monoxide (CO) and carbon dioxide ($CO_2$) is generated, and when the large amount of carbon monoxide (CO) and carbon dioxide ($CO_2$) generated at the initial combustion is discharged at the same time, it may result in inconvenience to the user.

For example, as illustrated in FIG. 18, when the divider 43 is mounted and the auxiliary air supply unit 100 is operated, air sucked by the auxiliary air supply unit 100 is supplied to the first cooking space 41. In this manner, the air sucked by the auxiliary air supply unit 100 prevents the air from flowing from the second cooking space 43 to the first cooking space 41. In this instance, when the second burner 62 is ignited during the operation of the auxiliary air supply unit 100, waste gas caused by the combustion of the second burner 62 is discharged to the outside through the auxiliary exhaust port 91 at the same time. In other words, the large amount of carbon monoxide (CO) and carbon dioxide ($CO_2$) generated when the second burner 62 is ignited may be discharged to the outside of the gas oven 1 through the auxiliary exhaust port 91.

In order to prevent the large amount of carbon monoxide (CO) and carbon dioxide ($CO_2$) from being discharged to the outside of the gas oven 1 when the second burner 62 is ignited, the gas oven 1 may reduce the rotational speed of the auxiliary air supply fan 120 included in the auxiliary air supply unit 100. Specifically, the control unit 200 of the gas oven 1 may reduce the voltage applied to the auxiliary air supply fan motor (not illustrated) providing the rotational speed to the auxiliary air supply fan 120. For example, as illustrated in FIG. 20, the control unit 200 may supply a voltage of 12 volts to the auxiliary air supply fan 120 during the operation of the first burner 61. When the operation of the second burner 62 is started during the operation of the first burner 61, the control unit 200 may supply a voltage of 8 volts to the auxiliary air supply fan 120.

When the rotational speed of the auxiliary air supply fan 120 is reduced, an amount of air supplied to the first cooking space 41 by the auxiliary air supply unit 100 is reduced. As a result, the large amount of carbon monoxide (CO) and carbon dioxide (CO2) generated when the second burner 62 is ignited may flow to the first cooking space 41 through a space between the divider 43 and the door 20 without being discharged to the outside at the same time. In addition, air is still supplied to the first cooking space 41 through the auxiliary air supply unit 100, and therefore the first burner 61 is not extinguished. For example, as illustrated in FIG. 19, when the divider 43 is removed and the auxiliary air supply unit 100 is operated, the air sucked by the auxiliary air supply unit 100 is supplied to the cooking space 40. In this manner, the air sucked by the auxiliary air supply unit 100 prevents the air from flowing from the lower side of the cooking space 40 to the upper side of the cooking space 40.

In this instance, when the second burner 62 is ignited during the operation of the auxiliary air supply unit 100, the large amount of carbon monoxide (CO) and carbon dioxide (CO2) generated when the second burner 62 is ignited may be discharged to the outside of the gas oven 1 through the auxiliary exhaust port 91. In order to prevent the large amount of carbon monoxide (CO) and carbon dioxide (CO2) from being discharged to the outside of the gas oven 1 when the second burner 62 is ignited, the gas oven 1 may reduce the rotational speed of the auxiliary air supply fan 120 included in the auxiliary air supply unit 100.

For example, as illustrated in FIG. 20, the control unit 200 may supply a voltage of 12 volts to the auxiliary air supply fan 120 during the operation of the first burner 61. When the operation of the second burner 62 is started during the operation of the first burner 61, the control unit 200 supplies a voltage of 8 volts to the auxiliary air supply fan 120. Next, in operation 1140, the gas oven 1 determines whether deceleration time has elapsed after the reduction of the rotational speed of the auxiliary air supply fan 120.

The control unit 200 of the gas oven 1 determines whether rotation time during which the auxiliary air supply fan 120 is rotated at a low speed reaches predetermined deceleration time. When it is determined that the deceleration time has not elapsed (NO of operation 1140), the gas oven 1 maintains the low-speed rotation of the auxiliary air supply fan 120. In addition, in operation 1150, when it is determined that the deceleration time has elapsed (YES of operation 1140), the gas oven 1 rotates the auxiliary air supply fan 120 at a high speed. When sufficient time has elapsed after the ignition of the second burner 62, the combustion of the second burner 62 is smoothly performed, and the amount of carbon monoxide (CO) and carbon dioxide (CO2) generated by the combustion of the second burner 62 is reduced.

Thus, for the purpose of the smooth combustion of the first burner 61, the gas oven 1 increases the rotational speed of the auxiliary air supply fan 120. Specifically, the control unit 200 increases the voltage supplied to the auxiliary air supply fan motor. For example, as illustrated in FIG. 20, when a reduction time T1 has elapsed while the voltage of 8 volts is supplied to the auxiliary air supply fan 120, the control unit 200 may supply the voltage of 12 volts to the auxiliary air supply fan 120 again.

Figure 21:
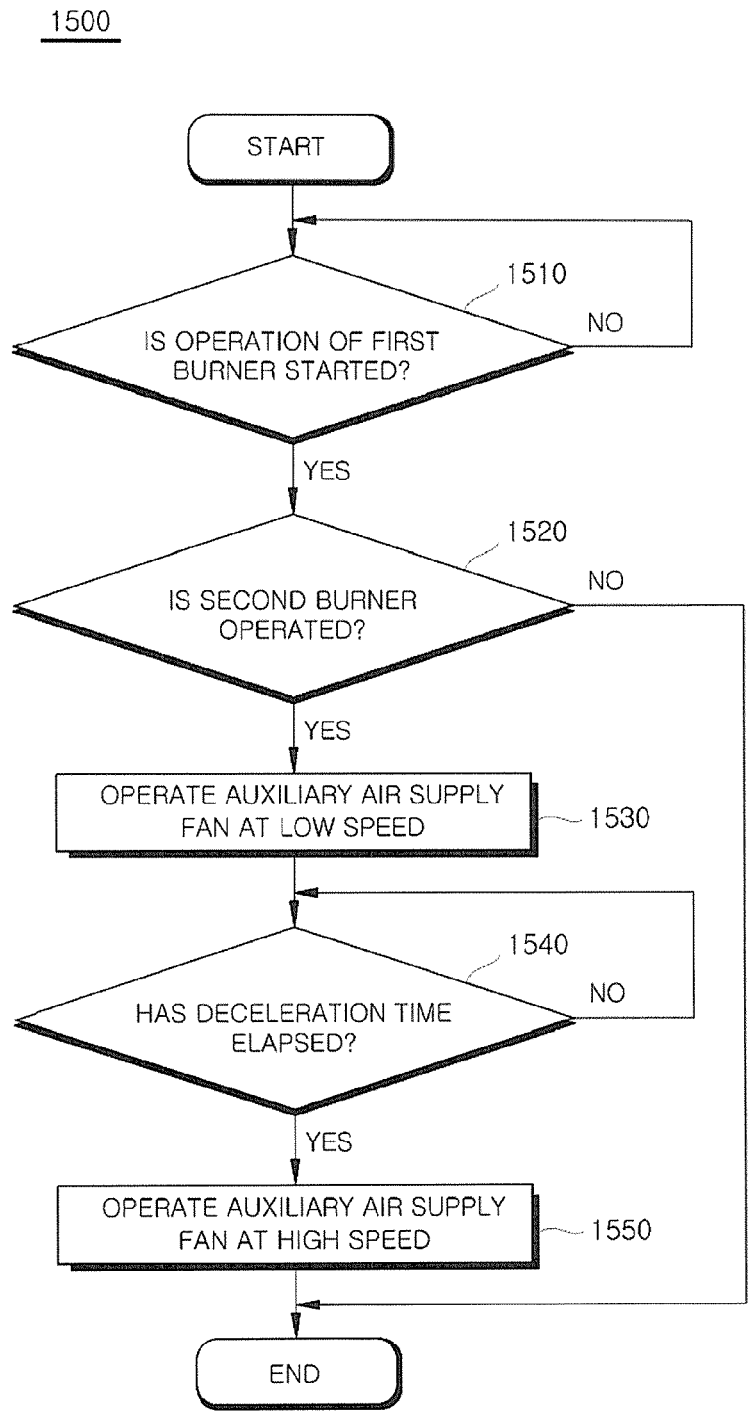
FIG. 21 illustrates still another example of an air supply control operation of a gas oven in accordance with an embodiment of the disclosure.
Figure 22:
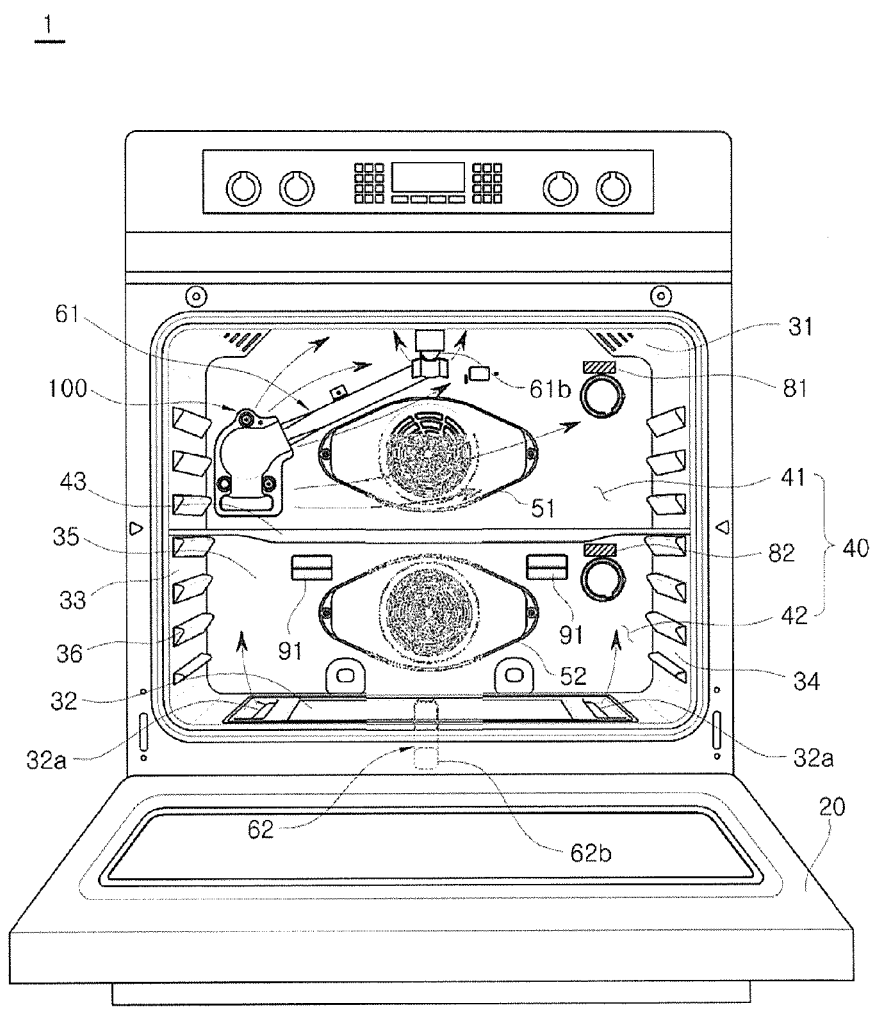
FIG. 22 illustrates the flow of air by the air supply control operation illustrated in FIG. 21.
Figure 23:
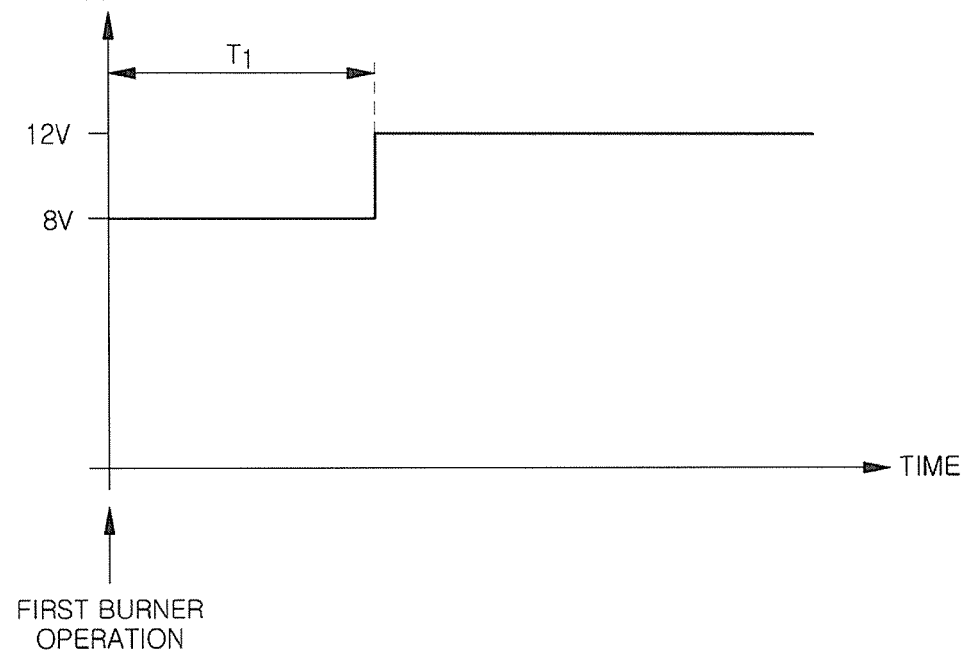
FIG. 23 illustrates a change in a voltage supplied to an auxiliary air supply fan in accordance with the air supply control operation illustrated in FIG. 21.

FIG. 21 illustrates still another example of an air supply control operation of a gas oven in accordance with an embodiment of the disclosure, FIG. 22 illustrates the flow of air by the air supply control operation illustrated in FIG. 21, and FIG. 23 illustrates a change in a voltage supplied to an auxiliary air supply fan in accordance with the air supply control operation illustrated in FIG. 21.

With reference to FIGS. 21 to 23, still another example 1500 of the air supply control operation of the gas oven 1 is described. In operation 1510, the gas oven 1 determines whether the operation of the first burner 61 is started. The control unit 200 of the gas oven 1 may determine whether the operation of the first burner 61 is started depending on a control command of a user, and whether the divider 43 is mounted. For example, when a "divider mounting signal" is input from the divider detection unit 70 and a broiling command or a baking command for the first cooking space 41 is input from the user interface 11, the control unit 200 may open the first burner valve 61a and determine that the operation of the first burner 61 is started. When a "divider removal signal" is input from the divider detection unit 70 and the broiling command is input from the user interface 11, the control unit 200 may open the first burner valve 61a and determine that the operation of the first burner 61 is started. In addition, the control unit 200 may determine whether the operation of the first burner 61 is started depending on the temperature of the first cooking space 41.

As described, when the cooking command (the baking command or the broiling command) for the first cooking space 41 is input, the gas oven 1 operates the first burner 61. Next, when the temperature of the first cooking space 41 is the cooking temperature set by the user or higher, the gas oven 1 stops the operation of the first burner 61, and when the temperature of the first cooking space 41 is lower than the cooking temperature set by the user, the gas oven 1 re-operates the first burner 61. In this manner, when the operation of the first burner 61 is stopped and then the temperature of the first cooking space 41 is lower than the set cooking temperature, the control unit 200 may open the first burner valve 61a and determine that the operation of the first burner 61 is started. When it is determined that the operation of the first burner 61 is not started (NO of operation 1510), the gas oven 1 continues the existing operation.

In addition, in operation 1520, when it is determined that the operation of the first burner 61 is started (YES of operation 1510), the gas oven 1 determines whether the second burner 62 is operated. The control unit 200 of the gas oven 1 may determine whether the second burner 62 is operated depending on whether the second burner valve 62a is opened. Specifically, when the second burner valve 62a is opened, the control unit 200 may determine that the second burner 62 is operated, and when the second burner valve 62a is closed, the control unit 200 may determine that the second burner 62 is not operated.

In addition, the control unit 200 may determine whether the second burner 62 is operated with reference to operation information of the second burner 62 stored in the memory 220. The control unit 200 may store the operation information of the second burner 62 in the memory 220. For example, the control unit 200 may store the operation information of the second burner 62 in the memory 220 when the operation of the second burner 62 is started, and store the stop information of the operation of the second burner 62 in the memory 220 when the operation of the second burner 62 is stopped.

In operation 1550, when it is determined that the second burner 62 is not operated (NO of operation 1520), the gas oven 1 rotates the auxiliary air supply fan 120 at a high-speed. The control unit 200 may transmit an "auxiliary air supply fan operating signal" for rotating the auxiliary air supply fan 120 to the auxiliary air supply unit 100. In particular, the control unit 200 may supply a high voltage (a voltage of 12 volts) to the auxiliary air supply fan 120 of the auxiliary air supply unit 100 so as to rotate the auxiliary air supply fan 120 at a high speed.

In addition, in operation 1530, when it is determined that the second burner 62 is operated (YES of operation 1520), the gas oven 1 rotates the auxiliary air supply fan 120 at a low speed. The control unit 200 may transmit the "auxiliary air supply fan operating signal" for rotating the auxiliary air supply fan 120 to the auxiliary air supply unit 100. In particular, the control unit 200 may supply a low voltage (a voltage of 8 volts) to the auxiliary air supply fan 120 of the auxiliary air supply unit 100 so as to rotate the auxiliary air supply fan 120 at a high speed.

As described, waste gas containing carbon monoxide (CO) and carbon dioxide (CO2) is generated at the time of combustion. In particular, at the time of initial combustion in which a flame is generated, waste gas containing a large amount of carbon monoxide (CO) and carbon dioxide (CO2) is generated, and when the large amount of carbon monoxide (CO) and carbon dioxide (CO2) generated at the initial combustion is discharged at the same time, it may result in inconvenience to the user.

For example, when the second burner 62 is operated, the waste gas generated from the second burner 62 flows to the first cooking space 41 as well as the second cooking space 42. In this manner, when the auxiliary air supply fan 120 is operated in the first cooking space 41 into which the waste gas flows, the waste gas caused by the initial combustion of the first burner 61 and the waste gas flowing into the first cooking space 41 are discharged at the same time, as illustrated in FIG. 21.

In this manner, in order to prevent the large amount of carbon monoxide (CO) and carbon dioxide (CO2) from being discharged to the outside of the gas oven 1 by the operation of the auxiliary air supply fan 120, the gas oven 1 may rotate the auxiliary air supply fan 120 at a low speed. Specifically, the control unit 200 of the gas oven 1 may supply a low voltage to the auxiliary air supply fan motor (not illustrated) of the auxiliary air supply fan 120. For example, as illustrated in FIG. 23, when the operation of the first burner 61 is started during the operation of the second burner 62, the control unit 200 may supply a voltage of 8 volts to the auxiliary air supply fan 120. When the rotational speed of the auxiliary air supply fan 120 is reduced, an amount of air supplied to the first cooking space 41 by the auxiliary air supply unit 100 is reduced. As a result, the large amount of carbon monoxide (CO) and carbon dioxide (CO2) generated when the first burner 61 is ignited is not discharged to the outside at the same time.

Next, in operation 1540, the gas oven 1 determines whether deceleration time has elapsed after the reduction of the rotational speed of the auxiliary air supply fan 120. The control unit 200 of the gas oven 1 may determine whether rotation time during which the auxiliary air supply fan 120 is rotated at a low speed reaches predetermined deceleration time. When it is determined that the deceleration time has not elapsed (NO of operation 1540), the gas oven 1 maintains the low-speed rotation of the auxiliary air supply fan 120. In addition, in operation 1550, when it is determined that the deceleration time has elapsed (YES of operation 1540), the gas oven 1 rotates the auxiliary air supply fan 120 at a high speed. When sufficient time has elapsed after the ignition of the first burner 61, the combustion of the second burner 62 is smoothly performed, and the amount of carbon monoxide (CO) and carbon dioxide (CO2) generated by the combustion of the first burner 61 is reduced.

Thus, for the purpose of the smooth combustion of the first burner 61, the gas oven 1 increases the rotational speed of the auxiliary air supply fan 120. Specifically, the control unit 200 increases the voltage supplied to the auxiliary air supply fan motor. For example, as illustrated in FIG. 23, when a reduction time T1 has elapsed while the voltage of 8 volts is supplied to the auxiliary air supply fan 120, the control unit 200 may supply the voltage of 12 volts to the auxiliary air supply fan 120 again. As described, the gas oven 1 may adjust the amount of air supplied to the cooking space 40 through the auxiliary air supply unit 100 so as to prevent the waste gas caused by the initial combustion of the first burner 61 or the second burner 62 from being discharged to the outside at the same time.

The temperature of the cooking space 40 may increase up to approximately 150 to 200 degrees by the operation of the first burner 61 or the second burner 62. In addition, as described, when the first burner 61 is not operated, the auxiliary air supply fan 120 is not operated. Thus, the auxiliary air supply fan 120 may be exposed to high-temperature air of the cooking space 40 while the first burner 61 is not operated. As a result, the auxiliary air supply fan 120 may be damaged by the high-temperature air. In order to prevent this, the gas oven 1 may operate the auxiliary air supply fan 120 depending on the temperature of the cooking space 40 even though the first burner 61 is not operated.

Figure 24:
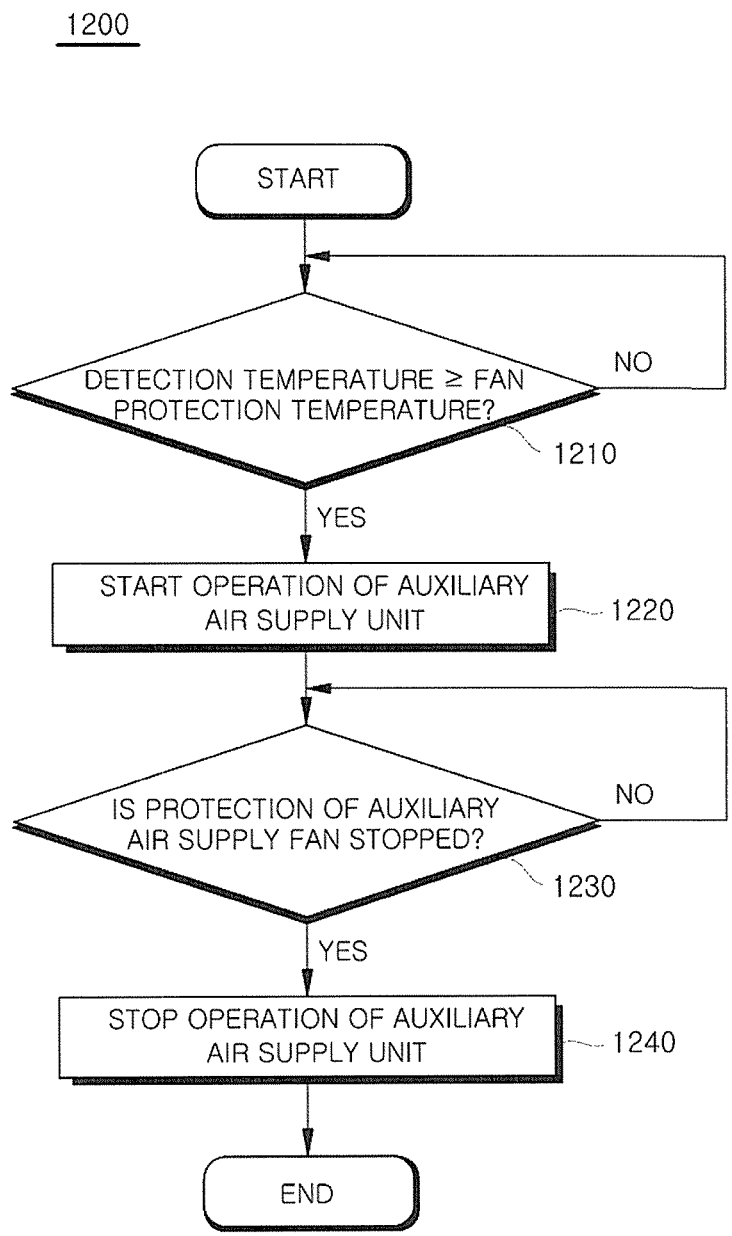
FIG. 24 illustrates yet another example of an air supply control operation of a gas oven in accordance with an embodiment of the disclosure.

FIG. 24 illustrates yet another example of an air supply control operation of a gas oven in accordance with an embodiment of the disclosure. With reference to FIG. 24, an example 1200 of the air supply control operation of the gas oven 1 is described.

In operation 1210, the gas oven 1 determines whether a detection temperature detected from the cooking space 40 is a fan protection temperature or higher. The control unit 200 of the gas oven 1 may compare the temperature of the cooking space 40 detected by the first temperature sensor 81 or the second temperature sensor 82 and the predetermined fan protection temperature. Here, the fan protection temperature may be determined to be higher than the temperature of the cooking space 40 set by the user.

For example, when the divider 43 is mounted, the control unit 200 may receive a first detection temperature of the first cooking space 41 from the first temperature sensor 81. In addition, the control unit 200 may compare the first detection temperature and the fan protection temperature, and thereby may determine whether the first detection temperature is the fan protection temperature or higher. In addition, when the divider 43 is not mounted, the control unit 200 may receive the first detection temperature from the first temperature sensor 81, and receive a second detection temperature from the second temperature sensor 82. In addition, the control unit 200 may compare the first and second detection temperatures and the fan protection temperature, and thereby may determine whether any one of the first and second detection temperatures is the fan protection temperature or higher.

When it is determined that the detection temperature is lower than the fan protection temperature (NO of operation 1210), the gas oven 1 continues the existing operation. In addition, in operation 1220, when it is determined that the detection temperature is the fan protection temperature or higher (YES of operation 1210), the gas oven 1 operates the auxiliary air supply unit 100.

As described, when the temperature of the cooking space 40 is the fan protection temperature or higher, the auxiliary air supply fan 120 may be damaged by the high-temperature air of the cooking space 40. In order to prevent the auxiliary air supply fan 120 from being damaged, the gas oven 1 may operate the auxiliary air supply fan 120 regardless of whether the first burner 61 is operated. For example, when the temperature of the first cooking space 41 is the fan protection temperature or higher during the operation of the second burner 62, the control unit 200 may operate the auxiliary air supply unit 100.

In addition, when the temperature of the cooking space 40 is the fan protection temperature or higher even though the first burner 61 and the second burner 62 are not operated, the control unit 200 may operate the auxiliary air supply unit 100. Specifically, the control unit 200 of the gas oven 1 may transmit an "auxiliary air supply fan operating signal" for rotating the auxiliary air supply fan 120 to the auxiliary air supply unit 100. In this instance, the control unit 200 may supply a low voltage (a voltage of 8 volts) to the auxiliary air supply fan 120 so as to rotate the auxiliary air supply fan 120 at a low speed. When the auxiliary air supply fan 120 is operated, the high-temperature air inside the cooking space 40 does not reach the auxiliary air supply fan 120, so that it is possible to prevent the damage to the auxiliary air supply fan 120.

Next, in operation 1230, the gas oven 1 determines whether to stop a protection operation of the auxiliary air supply fan 120. The control unit 200 of the gas oven 1 may stop the protection operation of the auxiliary air supply fan 120 by a variety of conditions. For example, when time during which the auxiliary air supply fan 120 is operated in order to protect the auxiliary air supply fan 120 is the predetermined fan protection time or longer, the control unit 200 may stop the protection operation of the auxiliary air supply fan 120. This is because it may be determined that the temperature of the cooking space 40 decreases by the operation of the auxiliary air supply fan 120 when the auxiliary air supply fan 120 is operated for the fan protection time or longer. In addition, when the temperature of the cooking space 40 is lower than the fan protection time, the control unit 200 may stop the protection operation of the auxiliary air supply fan 120. This is because the auxiliary air supply fan 120 is not damaged when the temperature of the cooking space 40 is lower than the fan protection temperature.

In operation 1240, when it is determined that the protection operation of the auxiliary air supply fan 120 is stopped (YES of operation 1230), the gas oven 1 stops the operation of the auxiliary air supply unit 100. Specifically, the control unit 200 of the gas oven 1 may transmit an "auxiliary air supply fan stopping signal" for stopping the rotation of the auxiliary air supply fan 120 to the auxiliary air supply unit 100. For example, the control unit 200 may supply a voltage of 0 volts to the auxiliary air supply fan 120. As described, the gas oven 1 may operate the auxiliary air supply fan 120 depending on the temperature of the cooking space so as to protect the auxiliary air supply fan 120.

The cooking space 40 is likely to be contaminated by the cooked object accommodated in the cooking space 1 during the use of the gas oven 1. In order to prepare for the contamination of the cooking space 40, the gas oven 1 provides a self-cleaning mode to a user. In the self-cleaning mode, the gas oven 1 increases the temperature inside the cooking space 40 up to a cleaning temperature (approximately 410 degrees Celsius) using the second burner 62. As a result, foreign substances inside the cooking space 40 are burned by a high temperature, and a user may easily clean the inside of the cooking space 40.

In such a self-cleaning mode, the first burner 61 is not operated, and therefore the auxiliary air supply fan 120 may be exposed to the high-temperature air of the cooking space 40, and the auxiliary air supply fan 120 is likely to be damaged. In order to prevent this, the gas oven 1 may operate the auxiliary air supply fan 120 in the self-cleaning mode even though the first burner 61 is not operated.

Figure 25:
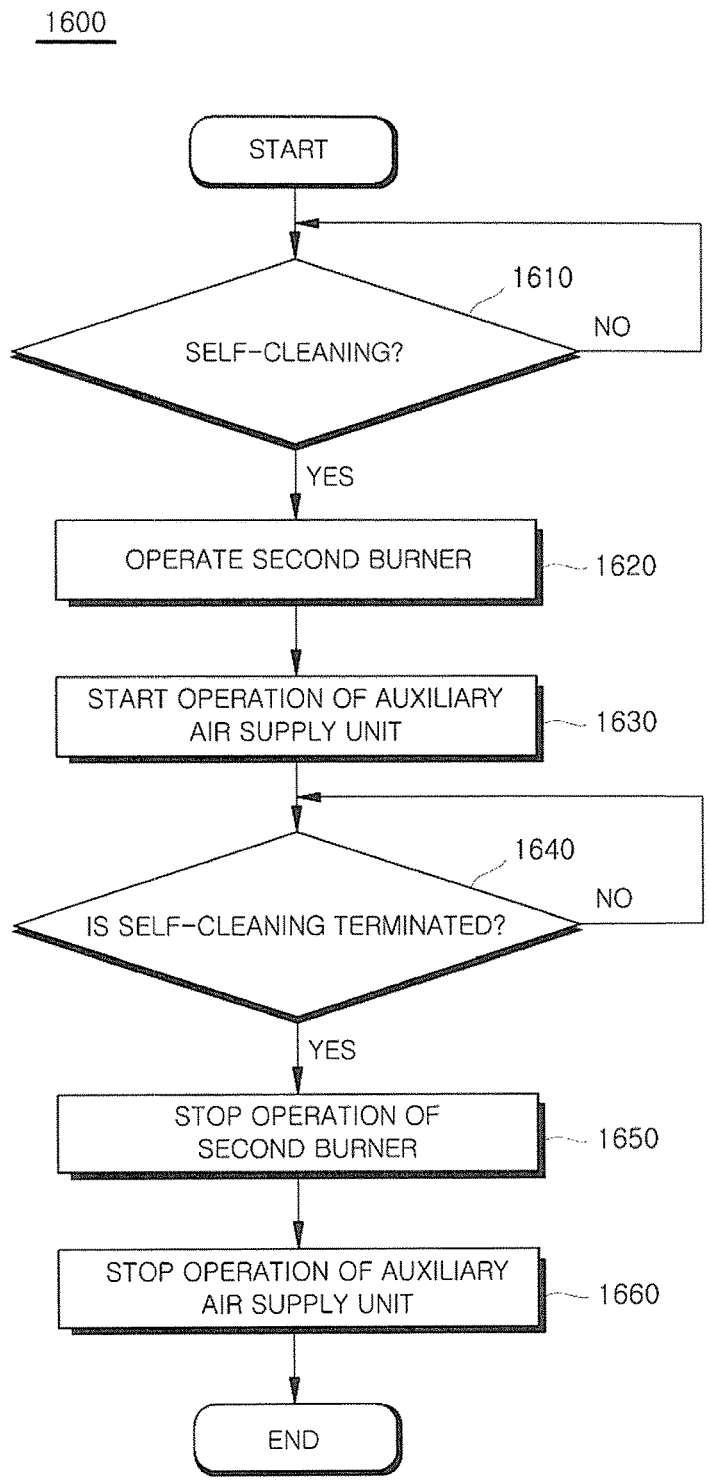
FIG. 25 illustrates further example of an air supply control operation of a gas oven in accordance with an embodiment of the disclosure.

FIG. 25 illustrates further example of an air supply control operation of a gas oven in accordance with an embodiment of the disclosure. With reference to FIG. 25, further example 1600 of the air supply control operation of the gas oven 1 is described. In operation 1610, the gas oven 1 determines whether to perform a self-cleaning operation. The control unit 200 of the gas oven 1 may determine whether to perform the self-cleaning operation based on a control command of a user input through the user interface 11. Specifically, when the inside of the cooking space 40 is contaminated by the foreign substances, a user may input a self-cleaning command through a self-cleaning button provided in the user interface 11. When the self-cleaning command is input from the user, the gas oven 1 may start the self-cleaning operation.

In operation 1620, when it is determined that the self-cleaning operation is performed (YES of operation 1610), the gas oven 1 operates the second burner 62. In order to heat the inside of the cooking space 40, the control unit 200 of the gas oven 1 may operate the second burner 62. Specifically, the control unit 200 may open the second burner valve 62a of the second burner 62. In addition, in operation 1630, the gas oven 1 operates the auxiliary air supply unit 100.

As described, the temperature inside the cooking space 40 is maintained at a high temperature in the self-cleaning mode, and therefore the auxiliary air supply fan 120 is likely to be damaged by the high-temperature air of the cooking space 40. In order to prevent the damage to the auxiliary air supply fan 120, the gas oven 1 may operate the auxiliary air supply fan 120 regardless of whether the first burner 61 is operated. Specifically, the control unit 200 of the gas oven 1 may transmit an "auxiliary air supply fan operating signal" for rotating the auxiliary air supply fan 120 to the auxiliary air supply unit 100. In this instance, the control unit 200 may supply a low voltage (such as a voltage of 8 volts) to the auxiliary air supply fan 120 so as to rotate the auxiliary air supply fan 120 at a low speed.

When the auxiliary air supply fan 120 is operated, the high-temperature air inside the cooking space 40 does not reach the auxiliary air supply fan 120, so that it is possible to prevent the damage to the auxiliary air supply fan 120. Next, in operation 1640, the gas oven 1 determines whether to terminate the self-cleaning operation. The control unit 200 of the gas oven 1 may determine whether to terminate the self-cleaning operation based on self-cleaning time input by the user. Specifically, the user may set a self-cleaning setting time for performing self-cleaning when a self-cleaning command is input. The control unit 200 may compare time during which the self-cleaning is performed and the self-cleaning setting time input by the user, and terminate the self-cleaning when the time during which the self-cleaning is performed is the self-cleaning setting time or longer.

When it is determined that the self-cleaning is not terminated (NO of operation 1640), the gas oven 1 continues the self-cleaning operation. In addition, in operation 1650, when it is determined that the self-cleaning is terminated (YES of operation 1640), the gas oven 1 stops the operation of the second burner 62. The control unit 200 of the gas oven 1 may stop the operation of the second burner 62. Specifically, the control unit 200 may close the second burner valve 62a of the second burner 62. In addition, in operation 1660, the gas oven 1 stops the operation of the auxiliary air supply unit 100. The control unit 200 of the gas oven 1 may transmit an "auxiliary air supply fan stopping signal" for stopping the rotation of the auxiliary air supply fan 120 to the auxiliary air supply unit 100. For example, the control unit 200 may supply a voltage of 0 volts to the auxiliary air supply fan 120.

As described, the gas oven 1 may operate the auxiliary air supply fan 120 during the self-cleaning operation so as to protect the auxiliary air supply fan 120.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A control method of a gas oven that includes a cooking space that is divided into a first cooking space and a second cooking space by a removable divider, a burner that directly heats a cooked object accommodated in the first cooking space, and an auxiliary heater that heats air of the first cooking space, the control method comprising:
    performing baking for the first cooking space when a baking mode for the first cooking space is selected among a plurality of cooking modes, wherein the baking for the first cooking space includes:
        operating the burner so that a temperature of the first cooking space reaches a first setting temperature, and
        operating the auxiliary heater so that the temperature of the first cooking space reaches a second setting temperature higher than the first setting temperature.

2. The control method according to claim 1, wherein the operating of the burner includes:
    stopping the operating of the burner when the temperature of the first cooking space is the first setting temperature or higher during the operating of the burner, and
    intermittently operating the burner when the temperature of the first cooking space is lower than the first setting temperature while the operating of the burner is stopped.

3. The control method according to claim 1, wherein the operating of the auxiliary heater includes:
    stopping the operating of the auxiliary heater when the temperature of the first cooking space is the second setting temperature or higher during the operating of the auxiliary heater, and
    operating the auxiliary heater when the temperature of the first cooking space is lower than the second setting temperature while the operating of the auxiliary heater is stopped.

4. The control method according to claim 1, further comprising:
    stopping operating of a convection fan for circulating the air of the first cooking space during the operating of the burner; and
    operating the convection fan while the operating of the burner is stopped.

5. A gas oven comprising:
    a cooking space;
    a divider that is removably provided in the cooking space and divides the cooking space into a first cooking space and a second cooking space;
    a first burner configured to directly heat a cooked object accommodated in the first cooking space by burning a gaseous fuel;
    a second burner configured to heat air of the second cooking space by burning the gaseous fuel;
    an auxiliary heater configured to heat air of the first cooking space;
    an input unit configured to receive a bake-heating command from a user; and
    a controller configured to:
        start an operation of the first burner in response to the bake-heating command for the first cooking space,
        stop the operation of the first burner when a temperature of the first cooking space is a first reference temperature or higher,
        repeat starting the operation of the first burner and stopping the operation of the first burner when the temperature of the first cooking space is lower than the first reference temperature, and
        operate the auxiliary heater when the temperature of the first cooking space is lower than a second reference temperature.

6. The gas oven according to claim 5, wherein, in response to the bake-heating command for the second cooking space, the controller is further configured to:
    stop an operation of the second burner when a temperature of the second cooking space is the first reference temperature or higher, and
    start the operation of the second burner when the temperature of the second cooking space is lower than the first reference temperature.

7. The gas oven according to claim 5,
    wherein to operate the auxiliary heater when the temperature of the first cooking space is lower than a second reference temperature comprises the controller is further configured to
    start a supply of power to the auxiliary heater when the temperature of the first cooking space is lower than the second referenced temperature, and
    stop the supply of the power to the auxiliary heater when the temperature of the first cooking space is the second reference temperature or higher.

8. The gas oven according to claim 7, wherein the second reference temperature is higher than the first reference temperature by 10 to 30 degrees Fahrenheit.

9. The gas oven according to claim 5, further comprising:
    a convection fan configured to circulate air of the first cooking space,
    wherein the controller is further configured to:
        stop an operation of the convection fan while the first burner is operating, and
        start the operation of the convection fan while the operation of the first burner is stopped.

10. The gas oven according to claim 5, further comprising:
    an auxiliary air supply fan configured to supply air to the first cooking space, wherein the controller is further configured to:
        start an operation of the auxiliary air supply fan when the first burner is operating, and
        stop the operation of the auxiliary air supply fan when the operation of the first burner is stopped.

11. The gas oven according to claim 10, wherein, when the second burner is operated during the operation of the auxiliary air supply fan, the controller is configured to reduce a rotational speed of the auxiliary air supply fan.

12. The gas oven according to claim 10, wherein, when the temperature of the first cooking space is a predetermined fan protection temperature or higher, the controller is configured to operate the auxiliary air supply fan.

13. A control method of a gas oven that includes a cooking space that is divided into a first cooking space and a second cooking space by a removable divider, a first burner that directly heats a cooked object accommodated in the first cooking space, and a second burner that heats air of the second cooking space, the control method comprising:
receiving a bake-heating command from a user; and
performing a bake-heating operation of the first cooking space when the bake-heating command for the first cooking space is received, wherein the bake-heating operation of the first cooking space includes:
stopping an operation of the first burner when a temperature of the first cooking space is equal to or higher than a first reference temperature, and
repeating starting of the operation of the first burner and the stopping of the operation of the first burner when the temperature of the first cooking space is lower than the first reference temperature, and
operating an auxiliary heater when the temperature of the first cooking space is lower than a second referenced temperature.

14. The control method according to claim 13, further comprising:
performing a bake-heating operation of the second cooking space when the bake-heating command for the second cooking space is received, wherein the bake-heating operation of the second cooking space includes:
stopping an operation of the second burner when a temperature of the second cooking space is equal to or higher than the first reference temperature, and
starting the operation of the second burner when the temperature of the second cooking space is lower than the first reference temperature.

15. The control method according to claim 13, wherein operating the auxiliary heater when the temperature of the first cooking space is lower than a second reference temperature comprises
starting a supply of power to the auxiliary heater for heating air of the first cooking space when the temperature of the first cooking space is lower than a second reference temperature; and
stopping the supply of the power to the auxiliary heater when the temperature of the first cooking space is the second reference temperature or higher.

16. The control method according to claim 15, wherein the second reference temperature is higher than the first reference temperature by 10 to 30 degrees Fahrenheit.

17. The control method according to claim 13, further comprising:
stopping operation of a convection fan for circulating air of the first cooking space while the first burner is operating; and
starting the operation of the convection fan while the operation of the first burner is stopped.

18. The control method according to claim 13, further comprising:
starting an operation of an auxiliary air supply fan for supplying air to the first cooking space when the first burner is operating; and
stopping the operation of the auxiliary air supply fan when the operation of the first burner is stopped.

19. The control method according to claim 18, further comprising:
reducing a rotational speed of the auxiliary air supply fan when the second burner is operating during the operation of the auxiliary air supply fan.

20. The control method according to claim 18, further comprising:
operating the auxiliary air supply fan when the temperature of the first cooking space is a predetermined fan protection temperature or higher.

\* \* \* \* \*